US007721068B2

(12) United States Patent
Lowe et al.

(10) Patent No.: US 7,721,068 B2
(45) Date of Patent: May 18, 2010

(54) RELOCATION OF ACTIVE DMA PAGES

(75) Inventors: Eric E. Lowe, Pflugerville, TX (US); Wesley Shao, Union City, CA (US)

(73) Assignee: Oracle America, Inc., Redwood Shores, CA (US)

( * ) Notice: Subject to any disclaimer, the term of this patent is extended or adjusted under 35 U.S.C. 154(b) by 865 days.

(21) Appl. No.: 11/451,785

(22) Filed: Jun. 12, 2006

(65) Prior Publication Data
US 2008/0005495 A1 Jan. 3, 2008

(51) Int. Cl.
G06F 9/26 (2006.01)
G06F 13/00 (2006.01)

(52) U.S. Cl. .................. 711/206; 711/165; 711/150; 711/170; 711/200; 711/202; 711/203; 711/207; 711/208; 711/209; 711/210; 710/36

(58) Field of Classification Search .................. 711/152, 711/150, 165, 170, 200, 202, 203, 206, 207, 711/208, 209, 210; 710/36
See application file for complete search history.

(56) References Cited

U.S. PATENT DOCUMENTS

| 4,787,031 A | | 11/1988 | Karger et al. ............... 718/100 |
|---|---|---|---|
| 4,961,134 A | | 10/1990 | Crus et al. ..................... 707/8 |
| 5,440,746 A | | 8/1995 | Lentz ......................... 345/504 |
| 5,574,944 A | * | 11/1996 | Stager .......................... 710/5 |
| 5,577,231 A | | 11/1996 | Scalzi et al. ................. 703/26 |
| 5,659,798 A | | 8/1997 | Blumrich et al. ............ 710/26 |
| 5,765,198 A | * | 6/1998 | McCrocklin et al. ........ 711/165 |
| 5,802,341 A | | 9/1998 | Kline et al. ................ 711/209 |
| 5,918,244 A | * | 6/1999 | Percival ..................... 711/119 |
| 6,052,699 A | | 4/2000 | Huelsbergen et al. ....... 707/206 |
| 6,067,608 A | * | 5/2000 | Perry ......................... 711/203 |
| 6,085,296 A | | 7/2000 | Karkhanis et al. ........... 711/147 |
| 6,112,286 A | * | 8/2000 | Schimmel et al. ........... 711/208 |
| 6,125,430 A | | 9/2000 | Noel et al. .................. 711/152 |
| 6,349,355 B1 | | 2/2002 | Draves et al. .................. 711/6 |

(Continued)

OTHER PUBLICATIONS

'CS372 class notes 11-13' from www.cs.utexas.edu/users/lorenzo/corsi/cs372/03F/notes/11-13.pdf, Nov. 21, 2003, by Corsi.*

(Continued)

*Primary Examiner*—Henry W. H. Tsai
*Assistant Examiner*—Steven G Snyder
(74) *Attorney, Agent, or Firm*—Osha • Liang LLP

(57) ABSTRACT

According to one embodiment of the invention, a technique is provided for facilitating the relocation of data from a source page to a destination page in a computing system in which I/O devices may conduct DVMA transactions via an IOMMU. Before the relocation, it is determined whether any devices potentially are accessing the source page. If it is determined that a device potentially is accessing the source page, then the IOMMU's device driver ("bus nexus") "suspends" the bus. The bus nexus allows any pending memory transactions to finish. While the bus is suspended, the kernel moves the contents of the source page to the destination page. After the kernel has moved the contents, the IOMMU's TLB is updated so that the virtual address that was mapped to the source page's physical address is mapped to the destination page's physical address. The bus nexus "unsuspends" the bus.

19 Claims, 10 Drawing Sheets

U.S. PATENT DOCUMENTS

| | | | |
|---|---|---|---|
| 6,366,994 B1 | 4/2002 | Kalyur | 711/173 |
| 6,553,435 B1* | 4/2003 | Normoyle et al. | 710/22 |
| 6,594,708 B1* | 7/2003 | Slaughter et al. | 719/315 |
| 6,622,226 B1 | 9/2003 | Dussud | 711/159 |
| 6,665,788 B1* | 12/2003 | Hughes | 711/206 |
| 6,804,729 B2* | 10/2004 | Swanberg | 710/22 |
| 6,922,765 B2 | 7/2005 | Jacobs | 711/173 |
| 7,007,146 B2 | 2/2006 | Romanufa et al. | 711/165 |
| 7,093,097 B2 | 8/2006 | Herr et al. | 711/171 |
| 7,389,399 B2* | 6/2008 | Terrell et al. | 711/203 |
| 2002/0108025 A1 | 8/2002 | Shaylor | 711/203 |
| 2004/0015622 A1* | 1/2004 | Avery | 710/22 |
| 2004/0123069 A1* | 6/2004 | Franaszek et al. | 711/206 |
| 2004/0187135 A1 | 9/2004 | Pronovost et al. | 718/104 |
| 2005/0050295 A1 | 3/2005 | Noel et al. | 711/206 |
| 2005/0086451 A1* | 4/2005 | Yates et al. | 712/32 |
| 2005/0120080 A1 | 6/2005 | Weinreb et al. | 709/203 |
| 2005/0144422 A1 | 6/2005 | McAlpine et al. | 711/206 |
| 2005/0193169 A1* | 9/2005 | Ahluwalia | 711/115 |
| 2005/0289550 A1 | 12/2005 | Blackmore et al. | 718/102 |
| 2006/0107020 A1 | 5/2006 | Stillwell et al. | 711/203 |
| 2006/0236063 A1 | 10/2006 | Hausauer et al. | 711/170 |
| 2006/0282839 A1 | 12/2006 | Hankins et al. | 719/318 |
| 2006/0294165 A1 | 12/2006 | Bacon et al. | 707/206 |
| 2007/0038891 A1 | 2/2007 | Graham | 714/28 |
| 2007/0288718 A1 | 12/2007 | Cholleti et al. | 711/170 |
| 2008/0005495 A1 | 1/2008 | Lowe et al. | 711/152 |

OTHER PUBLICATIONS

'Solaris Internals Kernel Architecture & Implementation' by McDougall et al., 2001.*

Rubini et al., "Linux Device Driver", $2^{nd}$ Edition, Jun. 2001, Chapter 2 and 13, 95 pages.

HP, "A C++/HP C Programmers Guide", Edition 3, Sep. 2004. (document not included in 15437-0736 Office Action dated Apr. 17, 2008 or in PAIRS, therefore no copy has been provided).

"Solaris 10 What's New" Sun Microsystems 4150 Network Circle, Santa Clara CA 95054, USA, PartNo.: 817-0547-18, May 2006, pp. 1-162.

Armstrong et al., "Advanced Virtualization Capabilities of Powers Systems", Sep. 2005, 15 pages.

IP.COM, "Mechanism for Dynamic Registering and Notifying Hypervisor Clients of Updates to High-Use Translation Control Entries", Aug. 2004, 3 pages.

Gibbs et al., "Advanced Power Virtualization on IBM eServer p5 Servers", Nov. 2005, 432 pages.

Matsubara, "IBM eServer pSeries 670 and pSeries 690 System", Jan. 2005, 266 pages.

* cited by examiner

RELOCATION OF ACTIVE DMA PAGES

BACKGROUND

The physical memory of a computing system is usually divided into physical pages. Each physical page is the same size in bytes. For example, in some computing systems, each physical page is 8192 bytes long. Each physical page has a unique page frame number (PFN). A physical page's PFN may be determined by dividing the starting physical memory address of that physical page by the page size. Thus, in a system in which each physical page contains 8192 bytes, the PFN of a physical page that contains physical memory addresses 0 through 8191 is 0, the PFN of a physical page that contains physical memory addresses 8192 through 16383 is 1, and the PFN of a physical page that contains physical memory address 16384 through 24575 is 2.

In many computing systems that employ a virtual memory management scheme, virtual memory address space is segregated into "user" virtual memory address space and "kernel" virtual memory address space. Each executing user process has its own user virtual memory address space. The system kernel has its own kernel virtual memory address space. Some physical pages are mapped into the user virtual memory address space, and some physical pages are mapped into the kernel virtual memory address space. Inasmuch as multiple user processes may share the same data, some of the virtual memory address space of each of two or more user process may be mapped to the same physical pages. In fact, a physical page that is mapped to user virtual memory address space may be concurrently mapped to kernel virtual memory address space, at least temporarily.

Each physical-to-virtual page mapping has a corresponding entry in a Translation Lookaside Buffer (TLB), which is typically implemented in hardware. Usually, when a process attempts to access data at a particular virtual address, it invokes a mechanism called the virtual memory subsystem. The virtual memory subsystem is typically a part of the operating system.

The virtual memory subsystem first attempts to find the relevant virtual-to-physical page mapping in the TLB, using the virtual address as a key. If the virtual memory subsystem cannot find a relevant, valid mapping in the TLB (a circumstance called a "TLB miss"), then the virtual memory subsystem attempts to find a relevant, valid mapping in a Translation Storage Buffer (TSB), which is similar in structure to the TLB, but larger and slower, and typically implemented in software. If the virtual memory subsystem cannot find a relevant, valid mapping in the TSB (a circumstance called a "TSB miss"), then the virtual memory subsystem attempts to find a relevant, valid mapping in "page tables," which are implemented as hash tables. If the virtual memory subsystem cannot find a relevant, valid mapping in the page tables (a circumstance called a "page fault"), then the virtual memory subsystem invokes a mechanism called the "page fault handler." The page fault handler locates a relevant, valid mapping using information within kernel internal tables, which may refer to persistent storage. Significantly, the kernel internal tables are stored in physical pages that are mapped to the kernel virtual memory address space.

A computing system may comprise multiple system boards. Each system board may comprise one or more CPUs and some physical memory. Each system board has a different range of physical memory addresses that does not overlap with any other system board's range of physical memory addresses.

Sometimes, a particular system board may be experiencing errors. Under such circumstances, it may be desirable to remove that system board from the computing system.

A large computing system may be logically divided into multiple separate domains. Each domain may be allocated one or more system boards. Each domain may be used by a different group of users for different purposes. For example, one domain might be used to run a web server. Another domain might be used to run a database.

At some point in time, it may become desirable to change the allocation of system boards to domains. Under some circumstances, it might be desirable to change the allocation on a regular basis (e.g., daily), automatically and dynamically. It is better for such reallocation to be performed with minimum disruption to the computing system and the processes executing thereon. For example, it is better for such reallocation to be performed without shutting down and rebooting the entire computing system, because rebooting the entire computing system can be a relatively time-consuming process. Usually, user processes cannot execute during much of the time that a computing system is rebooting.

Whenever a system board is going to be removed from a computing system, or whenever a system board is going to be allocated to a different domain, the data stored in that system board's physical pages needs to be relocated to the physical pages of another system board. Relocation involves moving the data that is stored in one set of physical pages to another set of physical pages.

When a user process' data need to be relocated, the data may be moved from the "source" physical pages to other "target" physical pages that have different PFNs. Before the data are moved, all entries (in the TSB, the TLB, and the page tables) that contain physical-to-virtual page mappings that correspond to the "source" physical pages are marked "invalid" so that no processes will be able to access the "source" physical pages during the relocation. The relevant physical-to-virtual page mappings are modified so that the appropriate "target" physical pages, to which the data have been moved, are mapped to the same virtual pages to which the "source" physical pages were mapped. The modified mappings are stored in the TLB, the TSB, and the page tables, and the entries containing the modified mappings are marked "valid." The user process continues to access its data using the same virtual addresses.

According to current approaches, a page fault handler is not invoked in response to a page fault that involves a mapping of a physical page to the kernel virtual memory address space. This is because the kernel internal tables that contain the mapping for which the page fault handler would be searching are stored in a physical page that is, itself, mapped to the kernel virtual memory address space. If the contents of that physical page were currently being relocated, then the virtual memory subsystem would not be able to locate a valid virtual-to-physical page mapping for that physical page in the TLB, the TSB, or the page tables; all of the entries containing that mapping would have been invalidated due to the relocation. An unending recursive cascade of page faults and page fault handler invocations would likely result, causing the entire computing system to fail.

Because a page fault handler is not invoked in response to a page fault that involves a mapping of a physical page to a virtual page that is in the kernel virtual memory address space, under current approaches, physical pages that are mapped to the kernel's virtual memory address space can only be relocated through a firmware-implemented technique.

Under the aforementioned firmware-implemented technique, all of the user processes executing in the computing system are quiesced (i.e., placed in a "suspended" state). Then, for each driver in the computing system, a "suspend entry point" for that driver is called. As a result, all of the drivers are quiesced as well. Then, all of the CPUs in the computing system, except for one CPU on a system board other than the "source" system board, are quiesced. Then the firmware of the one CPU that was not quiesced reads data from the "source" physical pages of the "source" system board and stores that data in the previously unoccupied "target" physical pages of a "target" system board. The firmware configures the physical memory addresses on the "target" system board to be the same as the physical memory addresses on the "source" system board. After the data has been copied from the "source" system board to the "target" system board, the "source" system board is removed from the computing system, the quiesced CPUs are resumed, the quiesced drivers are resumed, and the quiesced user processes are resumed.

When using the firmware-implemented relocation technique, the physical memory addresses on the "target" system board need to be the same as those on the "source" system board because, as is discussed above, it is not safe to invoke a page fault handler in response to a page fault that involves a mapping of a physical page to the kernel virtual memory address space. Therefore, under current approaches, all physical addresses that could be referenced by kernel processes need to remain the same throughout the relocation. This need makes it impractical for kernel virtual memory address space-mapped physical pages (hereinafter referred to as "kernel pages") to be spread throughout all of the system boards in a computing system.

For example, if kernel pages were distributed among all "N" of the system boards of a computing system, then relocating the data stored in those kernel pages would require an additional "N" more "target" system boards. The physical memory addresses on a given system board are required to be contiguous, so it is not possible, using the firmware-implemented technique, to move data from "N" "source" system boards onto fewer than "N" "target" system boards; at least "N" "target" system boards are required. However, it is usually not economically feasible to keep such a potentially large number of unused spare "target" system boards available.

According to one approach, sparsely populated system boards can be made into spare "target" system boards by moving user process data off of those system boards to other, more densely populated system boards. However, even this approach does not completely obviate the need to maintain all kernel pages within a limited subset of system boards.

Consequently, under current approaches, all of the kernel pages are confined to a limited subset of all of the system boards in a computing system, to compensate for the possibility that one or more of the system boards in that subset might be replaced at some point in time.

This confinement of kernel pages to a limited subset of all of the system boards has some negative consequences. Thousands of user processes might be concurrently executing on various system boards. At any given moment, many of these user processes may cause accesses to the kernel pages (e.g., as a result of page faults). Because all of the kernel pages are located on the same limited subset of system boards under current approaches, the input/output resources of the system boards in the limited subset are often subject to heavy contention. The overall performance of the entire computing system may be degraded as a result.

In order to reduce the contention on a limited subset of system boards, and thereby enhance overall computing system performance, techniques are needed for allowing kernel pages to be distributed among any or all of the system boards in a computing system.

One of the more difficult cases to consider when one desires to relocate kernel pages is the case in which kernel pages are being accessed via an "Input/Output Memory Management Unit," or "IOMMU," in a computing system that supports "Direct Virtual Memory Access," or "DVMA." In such systems, an IOMMU typically resides on a "host bridge chip" that sits between input/output (I/O) devices and physical memory. The I/O devices send virtual addresses to the IOMMU, which translates the virtual addresses into corresponding physical addresses. In such systems, for various reasons, the IOMMU typically cannot handle page faults correctly.

Therefore, previously, in such systems, the IOMMU needed to have access to valid virtual-to-physical translations at any time that a device attempted to access memory using DVMA. As matters previously stood, kernel pages could not be relocated while an I/O device was reading from or writing to those kernel pages using DVMA, because if a kernel page was being relocated at the time that an I/O device attempted to access that kernel page using DVMA, a fatal page fault might result.

Theoretically, one could attempt to solve the problem by mandating that all writers of device drivers everywhere must adapt their device drivers so that no device drivers would ever allow their corresponding I/O devices to perform DVMA relative to a kernel page that was being relocated. However, writers of device drivers would probably resist such a mandate, especially because platforms that allow DVMA might be a relatively insubstantial fraction of all platforms for which the writers produce the device drivers. In response to such a mandate, writers of device drivers might simply stop formally supporting the computing systems in which DVMA was performed. Additionally, some I/O devices might be so old that nobody is writing device drivers for those I/O devices anymore. Even if the mandate were uniformly followed, users of the computing systems would be burdened with the task of updating all of their device drivers.

SUMMARY

In accordance with one embodiment of the present invention, there is provided a technique for allowing the contents of kernel pages to be relocated even if those kernel pages are currently being accessed by I/O devices using DVMA. According to one embodiment of the invention, the technique does not require any modification of existing device drivers that correspond to such I/O devices. As a consequence of the technique, kernel pages may be distributed among any or all of the system boards in a computing system. The wider distribution of kernel pages reduces the contention on each of the system boards, which, in turn, enhances overall computing system performance.

According to one embodiment of the invention, before the contents of a source kernel page are relocated, a determination is made as to whether any I/O devices potentially are currently accessing the source kernel page. If it is determined that an I/O device potentially is currently accessing the source kernel page, then control is transferred to the IOMMU's device driver.

The IOMMU's device driver temporarily disallows any new memory transactions from being placed on the system I/O bus, thereby "suspending" the system I/O bus. The IOM- MU's device driver allows any memory transactions pending at the time of the suspension to finish. After all of the pending memory transactions have finished, the IOMMU's device driver transfers control to the operating system kernel.

While the system I/O bus is suspended, the kernel moves the contents of the source kernel page to a destination page. Through mechanisms described below, after the kernel has moved the contents of the source kernel page, the IOMMU's TLB is updated so that the virtual address that was formerly mapped to the physical address of the source kernel page is mapped to the physical address of the destination page instead. The kernel transfers control back to the IOMMU's device driver.

The IOMMU's device driver then "unsuspends" the system I/O bus. Thereafter, I/O devices are free to resume DVMA transactions. Throughout the entire process described above, the I/O device drivers may remain unaware that the IOMMU's device driver ever suspended the system I/O bus.

DETAILED DESCRIPTION OF EMBODIMENT(S)

Overview

Figure 1:
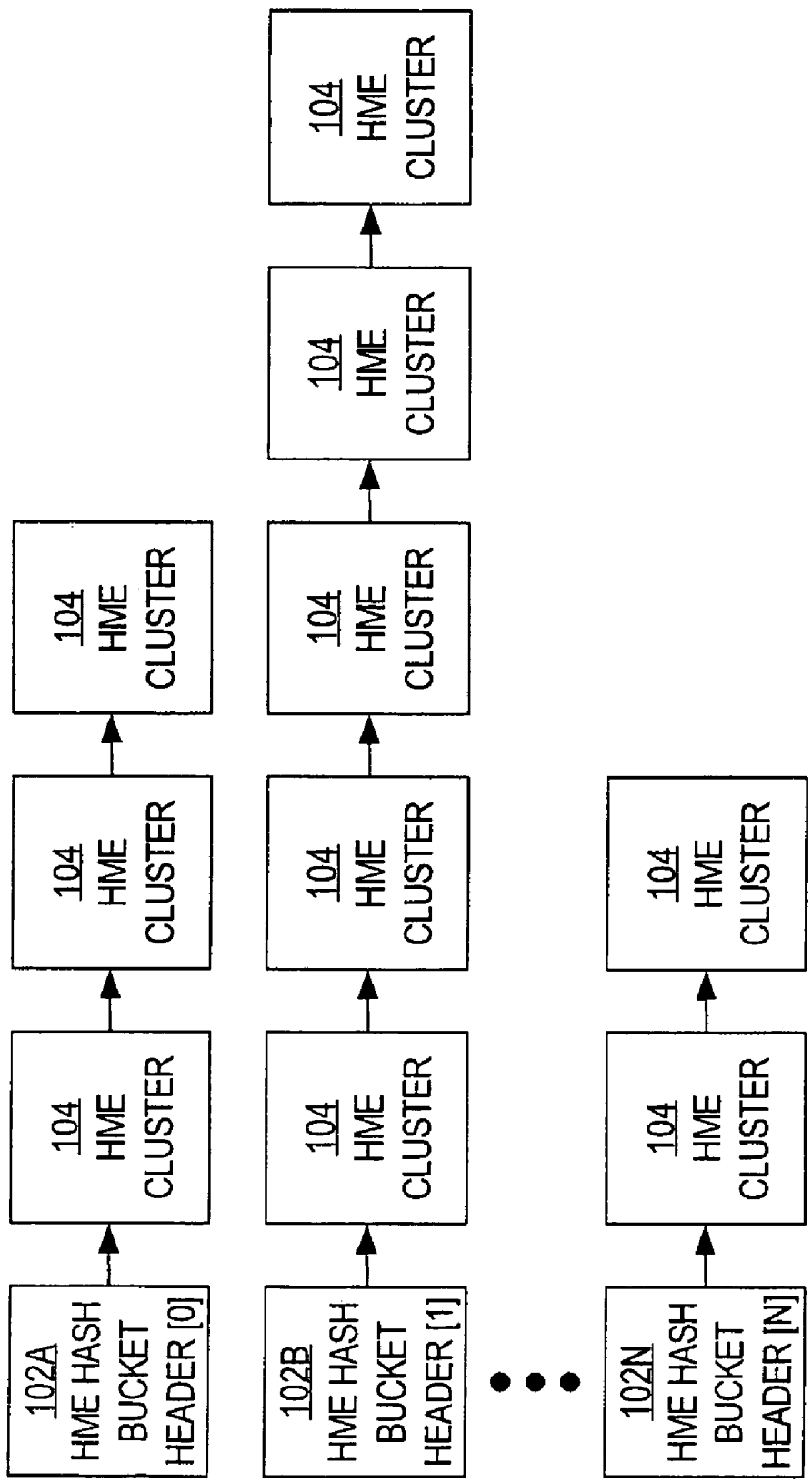
FIG. 1 is a block diagram that illustrates an example of the structure and organization of page tables, according to an embodiment of the invention.

According to one embodiment of the invention, before the first time that an I/O device driver is going to access a particular physical page using DVMA, the I/O device driver uses the computing system's device driver interface (DDI) to make a call to the IOMMU's device driver. In the call, the I/O device driver specifies a virtual address that the I/O device driver will be using to access the particular physical page (the I/O device driver may remain unaware of the physical address of the particular physical page). In response to the call, the IOMMU's device driver creates, in the IOMMU's TLB, a mapping between the specified virtual address and the physical address of the particular physical page.

The IOMMU's device driver also makes a call to the operating system kernel. In the call, the IOMMU's device driver specifies the physical address of the particular physical page. In response to the call, the kernel locates a particular "page-t" structure that corresponds to the particular physical page. "Page-t" structures are described in further detail below. Into a linked list of translation table entries (TTEs) to which the particular "page-t" structure refers, the kernel inserts a special "I/O page" type of TTE. TTEs generally are described in further detail below. The TTE that the kernel inserts indicates, among other things, that the IOMMU may be accessing the particular physical page on behalf of some I/O device.

Later, when the kernel has determined that the contents of the particular physical page are to be relocated, before moving the contents of the particular physical page, the kernel traverses the linked list of TTEs to which the particular "page-t" structure refers. When the kernel comes across the special "I/O page" TTE that the kernel inserted earlier, the kernel notices that the TTE indicates that the IOMMU may be accessing the particular physical page. In response, the kernel quiesces any CPUs that may be running, and makes a call to the IOMMU's device driver. In the call, the kernel indicates that the IOMMU needs to stop accessing the particular physical page, which the kernel identifies in the call.

In response to this call from the kernel, the IOMMU's device driver performs a series of steps. First, the IOMMU's device driver temporarily suspends the system I/O bus so that I/O devices cannot begin new DVMA transactions. An example technique for suspending the system I/O bus is described in greater detail below. Next, the IOMMU's device driver flushes all caches and/or FIFOs that may store information relating to pending DVMA transactions, thus causing those pending DVMA transactions to finish. Then the IOMMU transfers control to the kernel.

While the system I/O bus is suspended, the kernel moves the contents of the source kernel page to a destination page. Through techniques described below, the special "I/O page" TTE is moved (potentially along with other TTEs) from the linked list of TTEs to which the source kernel page's "page-t" structure refers, to a linked list of TTEs to which the destination page's "page-t" structure refers.

When the kernel has finished moving the contents of the source kernel page and the relevant TTEs, the kernel traverses the linked list of TTEs to which the destination page's "page-t" structure refers. In doing so, the kernel comes across the special "I/O page" TTE that the kernel inserted (and moved) earlier. In response, the kernel makes a call to the IOMMU's device driver. In the call, the kernel notifies the IOMMU that the IOMMU needs to update the mappings in the IOMMU's TLB to reflect the physical address of the destination page, which physical address the kernel identifies in the call.

In response to the kernel's call, the IOMMU's device driver updates an in memory table so that the virtual address that was formerly mapped to the physical address of the source kernel page is mapped to the physical address of the destination page instead. The IOMMU's device driver also invalidates any corresponding mapping in the IOMMU's TLB. The invalidation of the corresponding mapping in the IOMMU's TLB causes the IOMMU to load, into the IOMMU's TLB, the corresponding updated mapping from the in-memory table.

The IOMMU's device driver then "unsuspends" the system I/O bus. Thereafter, I/O devices are free to resume DVMA transactions. Throughout the entire process described above, the I/O device drivers may remain unaware that the IOMMU's device driver ever suspended the system I/O bus.

The IOMMU then transfers control to the kernel, which unsuspends any CPUs that the kernel quiesced earlier as described above.

In the discussion below, a brief description of the IOMMU and DVMA is provided prior to a discussion of some of the details of some of the structures and techniques referenced above.

IOMMU and DVMA

In some computing systems, the physical memory controller is located within the central processing unit (CPU). Additionally, in some computing systems, the physical addresses are not necessarily all contiguous; there may be some "holes" in the ranges of physical addresses. Such conditions often make it difficult for I/O devices to access memory using traditional DMA. For these and other reasons, some computing systems comprise an IOMMU through which I/O devices perform DVMA. For example, at least some implementations of the Sun SPARC platform comprise an IOMMU.

Typically, an IOMMU sits between (a) the physical address lines going into the physical memory controller and (b) the address lines on the system I/O bus. The IOMMU comprises a TLB that is structurally similar to, but separate from, the TLB discussed in the Background section. The IOMMU's TLB comprises entries that specify translations, or mappings, between virtual addresses and physical addresses. The IOMMU receives memory access requests from I/O devices that are connected to the system I/O bus.

Each such request specifies a virtual address. The type of virtual address specified in such a request should not be mistaken with the type of virtual address that an operating system would receive from a user process and translate into a physical address. The virtual address specified in such a request typically is meaningful only to the I/O device that issued the request (such a virtual address usually would not be meaningful to the operating system, for example).

Using the virtual address as a key, the IOMMU consults the IOMMU's TLB to determine a physical address that is mapped to the virtual address. The IOMMU then forwards the request, with the determined physical address, to the physical memory controller. The physical memory controller processes the request based on the physical address.

To the operating system and other devices, the IOMMU appears to be another device that is connected to the system I/O bus. The IOMMU is capable of raising I/O interrupts. Whenever the IOMMU cannot find, in its TLB, a mapping that corresponds to a virtual address specified in a request from an I/O device, the IOMMU raises an I/O interrupt on the system I/O bus. The I/O interrupt is serviced by a device driver that controls the IOMMU. The device driver that controls the IOMMU is called the "bus nexus."

The bus nexus attempts to discover a physical address to which the virtual address corresponds. If the bus nexus is successful, then the bus nexus inserts, into the IOMMU's TLB, a mapping between the virtual address and the physical address. After the mapping has been inserted into the IOMMU's TLB, the memory transaction may be restarted. Alternatively, if the bus nexus is unsuccessful, then the bus nexus may issue an error.

Thus, using DVMA, the translation process is transparent to both the requesting I/O devices and the CPU, including the physical memory controller. To both the CPU and the requesting I/O devices, a DVMA request appears to be a traditional DMA request (the requesting I/O devices treat the virtual addresses as though they were physical addresses). However, unlike traditional DMA, when memory is accessed using DVMA, the IOMMU performs a virtual-to-physical address translation between the I/O device and the CPU.

Suspending the System I/O Bus

As is discussed above in the Overview section, in response to a particular call from the kernel, the IOMMU's device driver suspends the system I/O bus so that I/O devices cannot begin new DVMA transactions. According to one embodiment of the invention, the IOMMU's device driver suspends the system I/O bus using the following technique.

Some computing systems comprise a "host bridge controller chip" that contains both an IOMMU and a "PCI bus master control register." Within the PCI bus master control register, there is a bit that controls whether PCI bus arbitration logic on the host bridge controller chip currently enables I/O devices to perform DVMA transactions on the system I/O bus. While the bit is set, the host bridge controller chip allows I/O device drivers to begin new DVMA transactions on the system I/O bus. While the bit is not set, the host bridge controller chip prevents I/O device drivers from beginning new DVMA transactions on the system I/O bus.

According to one embodiment of the invention, the IOMMU's device driver suspends the system I/O bus by clearing the bit that controls whether PCI bus arbitration logic on the host bridge controller chip currently enables I/O devices to perform DVMA transactions on the system I/O bus. According to one embodiment of the invention, while this bit is cleared, the PCI arbitration logic does not assert a PCI "grant" signal on the system I/O bus. When the PCI "grant" signal is not asserted, I/O devices are prevented from initiating new transactions on the system I/O bus, and I/O devices are required to complete or discontinue any pending transactions on the system I/O bus within a specified number of clock cycles.

In one embodiment of the invention, in order to determine whether all of the DVMA transactions on the system I/O bus have finished, the IOMMU device driver reads information from the PCI configuration space that is located on an I/O device that is connected to the system I/O bus. When the read operation completes, the IOMMU device driver is assured that all of the DVMA transactions on the system I/O bus have finished, because the read operation will be blocked until all of the pending DVMA transactions have completed; according to one embodiment of the invention, only one transaction can be on the system I/O bus at a time.

According to one embodiment of the invention, the IOMMU's device driver "unsuspends" the system I/O bus by setting the bit that controls whether PCI bus arbitration logic on the host bridge controller chip currently enables I/O devices to perform DVMA transactions on the system I/O bus. While this bit is set, the PCI arbitration logic asserts a PCI "grant" signal on the system I/O bus.

Flushing FIFOs to Complete Pending Transactions

In one embodiment of the invention, the host bridge controller chip comprises a plurality of FIFOs. Because the distance between an I/O device and the physical memory controller may be significant, and because it some time may pass before it is the IOMMU's turn to communicate with the physical memory controller, electrical signals asserted on the system I/O bus may be stored within these FIFOs and then repeated on the system I/O bus. These signals may represent pending DVMA transactions.

Before the kernel can be allowed to move the contents of a physical page, any pending DVMA transactions should be completed; if a pending DVMA transaction were allowed to complete relative to a source page after the contents of the source page were moved, then the destination page would contain a stale and inaccurate copy of the contents. Therefore, in one embodiment of the invention, before transferring control to the kernel, the IOMMU flushes all of the FIFOs discussed above. In one embodiment of the invention, the IOMMU flushes the FIFOs by calling a well-known "synch" routine that is provided specifically for this purpose.

When the FIFOs are flushed, the pending DVMA transactions that are represented by the signals stored in the FIFOs finish, and physical memory is updated according to the operations specified by the pending DVMA transactions.

"Page-t" Data Structures and TTEs

According to one embodiment of the invention, for each physical page (including kernel pages), there is a corresponding "page-t" data structure within the page tables. According to one embodiment of the invention, whenever a computing system boots up, a separate page-t structure is allocated for each physical page in the computing system. According to one embodiment of the invention, whenever memory is dynamically added to a computing system, a separate page-t structure is allocated for each physical page in the dynamically added memory. According to one embodiment of the invention, each page-t structure indicates the PFN of the physical page to which that page-t structure corresponds.

According to one embodiment of the invention, each page-t structure additionally contains a pointer or reference to a linked list of "Translation Table Entries" (TTEs). For each virtual page that is mapped to a page-t structure's corresponding physical page, the linked list to which that page-t structure points contains a TTE that indicates a mapping between that virtual page and the page-t structure's corresponding physical page. Thus, the linked list to which a page-t structure refers indicates all of the virtual pages that are mapped to that page-t structure's corresponding physical page.

According to one embodiment of the invention, whenever the contents of a "source" physical page are going to be relocated, a relocation thread exclusively locks the "source" physical page so that no other processes or threads can read from or write to the contents of the "source" physical page. The relocation thread also exclusively locks the "target" physical page to which the contents are going to be moved, so that no other processes or threads can read from or write to the "target" physical page. The relocation thread marks "invalid," in the TLB and the TSB, all mappings to the "source" physical page. In some computing systems, there are separate TLBs on each system board. In such computing systems, the relocation thread generates a "cross call" that marks "invalid" the relevant mappings in all TLBs on all system boards. Marking mappings invalid is sometimes called "flushing" or "unloading" the mappings.

Next, using the "source" physical page's PFN, the relocation thread locates the "source" physical page's corresponding page-t structure in the page tables. The relocation thread traverses the linked list of TTEs to which the page-t structure refers (hereinafter referred to as the "source linked list"). For each such TTE that indicates a mapping to user virtual memory address space, the relocation thread marks that TTE "invalid." For each such TTE that indicates a mapping to kernel virtual memory address space, the relocation thread marks that TTE "suspended" (e.g., by setting a "suspend" bit in that TTE), but does not mark that TTE "invalid," because doing so could later cause a page fault.

Next, the relocation thread moves the contents of the "source" physical page to the "target" physical page. Next, for each "valid" but "suspended" TTE in the source linked list, the relocation thread moves that TTE to a linked list to which the "target" physical page's corresponding page-t structure refers (hereinafter the "target linked list"). Thus, only TTEs that indicate mappings to user virtual memory address space remain in the source linked list.

In one embodiment of the invention, each TTE indicates the PFN that is indicated in the page-t structure that refers to the linked list that contains that TTE. In such an embodiment of the invention, after the appropriate TTEs have been moved to the target linked list as described above, the PFNs indicated in those TTEs are updated to indicate the PFN that is indicated in the page-t structure that refers to the target linked list.

After all of the above has been done, the relocation thread updates each of the moved TTEs to indicate that those TTEs are no longer "suspended" (e.g., by clearing a "suspend" bit in such TTEs). The relocation thread updates kernel internal tables that the page fault handler would consult in the event of a page fault. As a result of the update, all existing mappings between virtual addresses and the "source" physical page's corresponding page-t structure are changed, in the kernel internal tables, to mappings between those virtual addresses and the "target" physical page's corresponding page-t structure. The relocation thread then releases the exclusive locks from both the "source" and "target" physical pages.

Whenever a particular process or thread other than the relocation thread attempts to access the "source" physical page while the contents of the "source" physical page are being relocated, the virtual memory subsystem determines that the TLB and TSB entries that contain the relevant virtual-to-physical page mapping are marked "invalid" (resulting in TLB and TSB misses). As a result of this determination, the virtual memory subsystem seeks a relevant, valid mapping in the page tables. The virtual memory subsystem locates, in the page tables, the TTE that contains the relevant mapping.

If the relevant mapping maps the "source" physical page into kernel virtual memory, then the virtual memory subsystem ascertains that the TTE is marked "valid," but "suspended." Because the TTE is marked "valid," no page fault occurs. In response to ascertaining that the TTE is marked "suspended," the virtual memory subsystem instructs the particular process or thread to wait until the TTE is no longer marked "suspended." When the TTE is no longer marked "suspended," the particular process or thread stops waiting. The particular process or thread's attempt to access the virtual page causes a "miss handler" mechanism to be invoked. The miss handler loads the relevant, valid mapping from the TTE into the TSB and the TLB, and then causes the particular process' or thread's last executed program instruction (which caused a TLB miss and a TSB miss) to be re-executed. When the program instruction is re-executed, the virtual memory subsystem finds a relevant, valid mapping in the TLB.

Alternatively, if the relevant mapping maps the "source" physical page into user virtual memory, then the virtual memory subsystem ascertains that the TTE is marked "invalid." Because the TTE is marked "invalid," a page fault occurs. The virtual memory subsystem instructs the particular process or thread to wait. After the relocation thread releases the exclusive locks on the "source" and "target" physical pages as described above, the page fault handler uses the updated kernel internal tables to create a valid TTE in the target linked list. In the same manner as described above, the "miss handler" loads the relevant mapping from the valid TTE into the TSB and the TLB, and then causes the particular process' or thread's last executed program instruction to be re-executed.

As a result of the foregoing techniques, kernel pages do not need to be relocated using the firmware-implemented technique described in the Background above. Consequently, kernel pages may be distributed among any or all of the system boards in a computing system.

DMA and Special TTEs

In some computing systems, some processes (e.g., kernel processes) might access physical pages using the physical pages' physical memory addresses rather than virtual memory addresses that are mapped to those physical memory addresses. This kind of access is often called "direct memory access," or "DMA." After the contents of a "source" physical page have been relocated, the processes that had been accessing that physical page using DMA need to be apprised of the physical memory address of the "target" physical page to which the contents have been relocated; if those processes continued to use the physical memory address of the "source" physical page to perform DMA, then those processes would not be accessing the correct contents.

Therefore, in one embodiment of the invention, for each process that performs direct memory access relative to a physical page, the linked list to which that physical page's corresponding page-t structure refers contains a special TTE. The virtual-to-physical page mapping indicated in the special TTE identifies the physical page in place of a virtual page. The special TTE indicates (e.g., via a set bit) that it is a special TTE.

According to one embodiment of the invention, the special TTE contains a reference to a "pre-handler" mechanism and a reference to a "post-handler" mechanism. These handler mechanisms are customized to interact with a particular process. Thus, different special TTEs may contain references to different handler mechanisms. In such an embodiment, before a particular process uses DMA relative to a physical page, that process provides, to a registration mechanism, references to the handler mechanisms that are customized for that particular process. The registration mechanism adds, to the linked list to which the physical page's corresponding page-t structure refers, a special TTE that contains the references to the handler mechanisms.

In such an embodiment, whenever the contents of a "source" physical page are going to be relocated, the relocation thread traverses the source linked list as described above. Whenever the relocation thread locates a special TTE in the source linked list, the relocation thread invokes the pre-handler mechanism to which that special TTE refers. Each pre-handler mechanism, when invoked, causes its corresponding process to desist from attempting to access the "source" physical page (which may be identified as a parameter of the invocation of the pre-handler mechanism) using DMA until instructed otherwise. After the contents of the "source" physical page have been moved to the "target" physical page, as described above, the relocation thread again traverses the source linked list. This time, whenever the relocation thread locates a special TTE in the source linked list, the relocation thread invokes the post-handler mechanism to which that special TTE refers. Each post-handler mechanism, when invoked, may instruct its corresponding process that the previously halted DMAs may resume. The post-handler mechanism for a particular process may invoke a mechanism that causes a physical memory address to be "re-fetched" so that relevant mappings, such as that contained in the special TTE, are updated to refer to the "target" physical page instead of the "source" physical page.

Example Page Table Structure

As is discussed above, in one embodiment of the invention, when a TSB miss occurs, the virtual memory subsystem looks for a relevant, valid virtual-to-physical page mapping in the page tables. FIG. 1 is a block diagram that illustrates an example of the structure and organization of page tables, according to an embodiment of the invention.

According to one embodiment of the invention, the page tables are implemented as hash tables. FIG. 1 shows hardware mapping entry ("HME") hash bucket headers 102A-N and HME clusters 104. Each of HME hash bucket headers 102A-N corresponds to a different hash value. For example, HME hash bucket header 102A corresponds to a hash value of 0, HME hash bucket header 102B corresponds to a hash value of 1, and HME hash bucket header 102N corresponds to a hash value of N. The hash value to which an HME hash bucket header corresponds indicates the position of that HME hash bucket header in an array of HME hash bucker headers 102A-N. In one embodiment of the invention, each of HME hash bucket headers 102A-N is associated with a separate mutually exclusive ("mutex") lock that may be granted to and released by processes and threads.

One or more of HME hash bucket headers 102A-N points or refers to a separate linked list of HME clusters 104. For example, HME hash bucket header 102A is shown pointing to a linked list of 3 HME clusters 104, HME hash bucket header 102B is shown pointing to a linked list of 5 HME clusters 104, and HME hash bucket header 102N is shown pointing to a linked list of 2 HME clusters 104. The internal structure of each of HME clusters 104 is described below.

According to one embodiment of the invention, each of HME clusters 104 corresponds to a separate 64-kilobyte region in the virtual memory address space of some process that is executing on the computing system. Two or more of HME clusters 104 may correspond to different regions of the virtual memory address space of the same process. Each such process has a unique process identifier that also uniquely identifies that process' virtual memory address space.

An HME cluster is a specific type of "buffer." According to one embodiment of the invention, each HME cluster is approximately 400 bytes in size. Thus, in a computing system in which the physical page size is 8192 bytes, a single physical page may store up to 20 separate HME clusters. In one embodiment of the invention, any physical page that contains HME clusters contains only HME clusters, along with metadata for that physical page. The metadata may indicate, for example, that the physical page contains buffers that are of the HME cluster type. Thus, physical pages that contain HME clusters may be internally "homogeneous." A physical page that contains HME clusters is also called a "slab."

The metadata may additionally comprise a "buffer control" structure for the physical page. The buffer control structure may indicate, for example, which of the physical page's HME clusters are currently allocated to processes' virtual memory address spaces, which of the physical page's HME clusters are currently available for allocation to a process' virtual memory address space, how many of the physical page's HME clusters are currently allocated to processes' virtual memory address spaces, and/or the identities of the processes to whose virtual memory address spaces the HME clusters are currently allocated.

According to one embodiment of the invention, a separate "kmem-cache" structure is maintained, in at least one of the kernel pages, for each type of buffer in the computing system. The kmem-cache structure for the "HME cluster" buffer type identifies which physical pages currently store HME clusters, and which of those physical pages has at least one HME cluster that is currently available for allocation to a process' virtual memory address space.

Example HME Cluster

Figure 2:
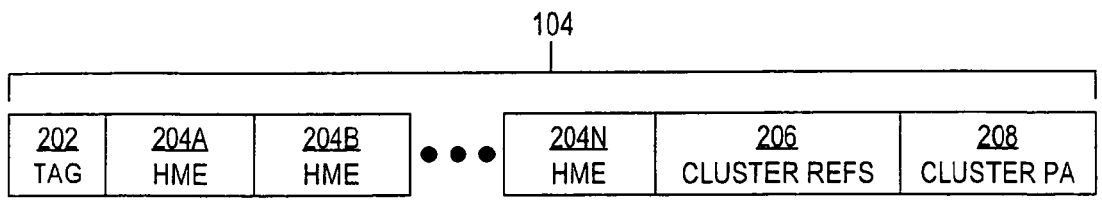
FIG. 2 is a block diagram that illustrates an example of the internal structure of a single HME cluster, according to an embodiment of the invention.

FIG. 2 is a block diagram that illustrates an example of the internal structure of a single HME cluster, according to an embodiment of the invention. HME cluster 104 comprises a tag 202, a block or "cluster" of HMEs 204A-N, HME cluster references 206, and an HME cluster physical address ("PA") 208. According to one embodiment of the invention, HME cluster 104 comprises a cluster of 8 HMEs 204A-N. Thus, each of HMEs 204A-N is located at a different offset from the start of HME cluster 104.

When HME cluster 104 is initially populated, the contents of tag 202 are hashed using a hash function to generate a hash key. One of hash bucket headers 102A-N corresponds to the hash key. HME cluster 104 is added to the linked list to which that HME hash bucket header refers. The internal structures of tag 202 and each of HMEs 204A-N are described below.

According to one embodiment of the invention, HME cluster references 206 comprise a reference or pointer to the next HME cluster in the linked list that contains HME cluster 104, if there is a next HME cluster in that linked list. For example, HME cluster references 206 may comprise both a physical address and a virtual address of the next HME cluster in the linked list. The virtual memory subsystem may use HME cluster references 206 to traverse the linked list. Because HME cluster references 206 contain physical addresses in one embodiment of the invention, the linked list can be traversed without the possibility of causing a page fault.

HME cluster PA 208 indicates the physical address of HME cluster 104. When HME cluster 104 is initially allocated in memory, HME cluster PA 208 is populated. When HME cluster 104 is added to a linked list to which one of HME hash bucket headers 102A-N refers, the HME cluster references of the HME cluster preceding HME cluster 104 are updated to indicate the value of HME cluster PA 208, thus creating the link between the two HME clusters in the linked list.

In an alternative embodiment of the invention, instead of containing separate HME cluster references 206 and HME cluster PA 208, HME cluster 104 contains a unified field that indicates the physical address of HME cluster 104 until another HME cluster is appended to the linked list after HME cluster 104. At that time, the unified field is updated to indicate the physical address of the HME cluster that was appended to the linked list.

According to one embodiment of the invention, the virtual memory subsystem locates a relevant virtual-to-physical page mapping as part of a "mapping lookup operation" using the following technique. First, the virtual memory subsystem concatenates (a) the process identifier of the process that is attempting to access a particular virtual address, (b) a base virtual address that is derived based on the particular virtual address, and (c) the size of each of HMEs 204A-N. The concatenation forms a tag key.

Next, the virtual memory subsystem hashes the tag key using the aforementioned hash function to produce a hash key. In an array of HME hash bucket headers, such as HME hash bucket headers 102A-N shown in FIG. 1, the virtual memory subsystem uses the hash key as an array index to locate the HME hash bucket header that corresponds to the hash key. The virtual memory subsystem obtains ownership of the mutex lock that is associated with that HME hash bucket header. While the virtual memory subsystem has ownership of the mutex lock, no other process or thread can modify the linked list of HME clusters to which the HME hash bucket header refers.

Then, the virtual memory subsystem traverses the linked list of HME clusters to which the appropriate HME hash bucket header refers. For each HME cluster in the linked list, the virtual memory subsystem compares that HME cluster's tag with the tag key. If that HME cluster's tag matches the tag key, then the virtual memory subsystem concludes that the HME cluster contains the relevant mapping. Using information contained in the appropriate HME cluster, the virtual memory subsystem performs further actions that are described below.

Figure 3:
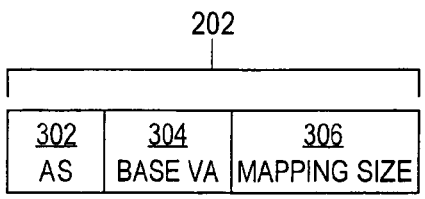
FIG. 3 is a block diagram that illustrates an example of the internal structure of a tag, according to an embodiment of the invention.

FIG. 3 is a block diagram that illustrates an example of the internal structure of a tag, such as tag 202, according to an embodiment of the invention. Tag 202 comprises an address space ("AS") identifier 302, a base virtual address ("VA") 304, and a mapping size indicator 306.

AS identifier 302 indicates a process identifier of a process to which the HME cluster that contains tag 202 corresponds. Each process is associated with its own virtual memory address space, which is independent of every other process' virtual memory address space, so in order to translate a virtual address into a physical address, the process in whose virtual memory address space that virtual address is located needs to be known. In one embodiment of the invention, a kernel process has a special process identifier that no user process ever has. Thus, whether or not a particular virtual memory address space is kernel virtual memory address space can be ascertained from AS identifier 302.

Base VA 304 indicates the virtual address that corresponds to the first (zero-offset) HME 204A in HME cluster 104. Because the virtual address of each HME in HME cluster 104 can be deduced based on base VA 304 and that HME's position in HME cluster 104, there is no need for the HMEs to contain their respective virtual addresses. Mapping size indicator 306 indicates the size of each of HMEs 204A-N.

Example HME

Figure 4:
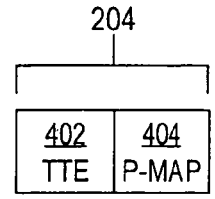
FIG. 4 is a block diagram that illustrates an example of the internal structure of a HME, according to an embodiment of the invention.

FIG. 4 is a block diagram that illustrates an example of the internal structure of a HME, such as any one of HMEs 204A-N, according to an embodiment of the invention. HME 204 comprises a TTE 402 and a "p-map" structure 404. TTE 402 is a TTE of the kind that is discussed above in the Overview. As is discussed above, TTE 402 indicates a virtual-to-physical page mapping. The internal structure of TTE 402 is described below.

A relocation thread can use "p-map" 404 to traverse a source linked list of TTEs during a relocation operation, as is described above in the Overview. According to one embodiment, "p-map" 404 contains a reference or pointer to a next TTE in the source linked list of which TTE 402 is a part. TTE 402 and the next TTE may be in separate HME clusters. Thus, when a relocation thread traverses a source linked list, the relocation thread may read TTEs within several separate HME clusters.

Figure 5:
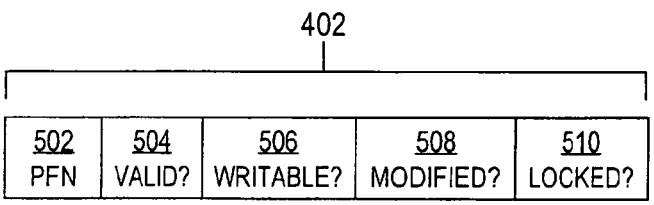
FIG. 5 is a block diagram that illustrates an example of the internal structure of a TTE, according to an embodiment of the invention.

FIG. 5 is a block diagram that illustrates an example of the internal structure of a TTE, such as TTE 402, according to an embodiment of the invention. TTE 402 comprises a PFN 502, a validity indicator 504, a writability indicator 506, a modified status indicator 508, and a locked status indicator 510.

Locked status indicator 510 indicates whether the physical page to which PFN 502 corresponds is locked. Validity indicator 504 indicates whether TTE 402 is valid or invalid. In one embodiment of the invention, validity indicator 504 additionally indicates whether TTE 402 is suspended.

In one embodiment of the invention, whenever validity indicator 504 is set to indicate that TTE 402 is invalid, a determination is made as to whether all of the TTEs in the same HME cluster as TTE 402 are also invalid. In such an embodiment, if all of the TTEs in that HME cluster are invalid, then the entire HME cluster is removed from the linked list that contains that HME cluster. When an HME cluster is removed in this manner, the HME cluster may be maintained and placed in a pool of available HME clusters. When an HME cluster needs to be allocated to a process, instead of creating an entirely new HME cluster, a kernel memory allocator mechanism may provide, to the process, one of the HME clusters in the pool.

TTE 402 indicates a virtual-to-physical page mapping by virtue of PFN 502: PFN 502 corresponds to a physical page, and base VA 304 corresponds to a virtual address, to which the offset of HME 204 from the start of HME cluster 104 may be added to produce the virtual address of a virtual page that is mapped to that physical page.

Thus, in one embodiment of the invention, after locating the correct HME cluster during a mapping lookup operation, as discussed above, the virtual memory subsystem performs arithmetic to determine which of the HMEs in that HME cluster corresponds to the virtual page. If the TTE in that HME is marked "valid" and is not marked "suspended," then the virtual memory subsystem concludes that the PFN indicated in that TTE corresponds to the physical page to which the virtual page is mapped. The virtual memory subsystem relinquishes ownership of the mutex lock that is associated with the HME hash bucket header that refers to the linked list that contains the HME cluster that contains the HME.

Example P-Mapping List

Figure 6:
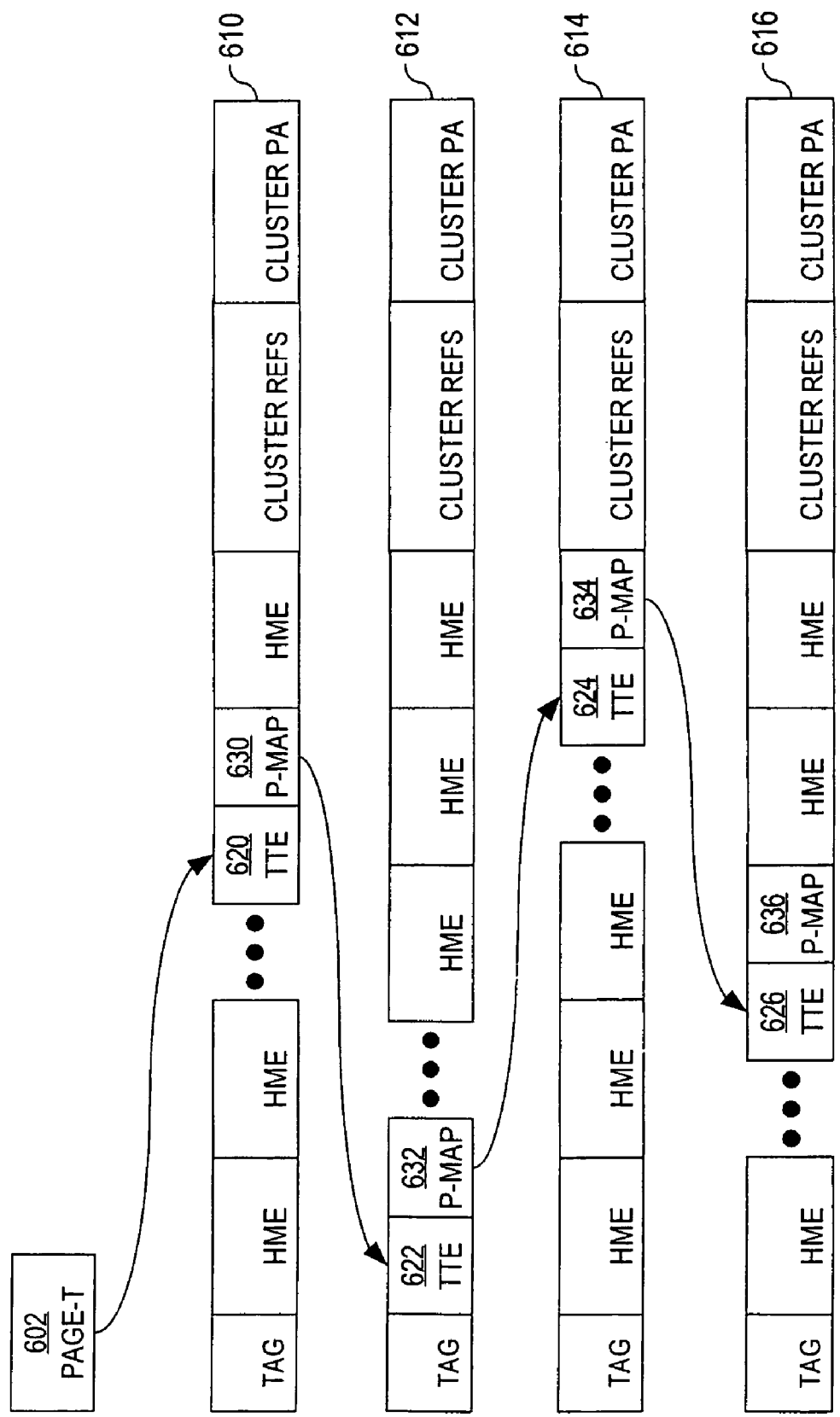
FIG. 6 is a block diagram that illustrates an example of a linked list of TTEs, according to an embodiment of the invention.

FIG. 6 is a block diagram that illustrates an example of a linked list of TTEs, according to an embodiment of the invention. Such a linked list also may be called a "p-mapping" list. A page-t structure 602 corresponds to a particular physical page. Page-t structure 602 refers to TTE 620 in HME cluster 610. P-map 630, which is in the same HME as TTE 620, refers to TTE 622 in HME cluster 612. P-map 632, which is in the same HME as TTE 622, refers to TTE 624 in HME cluster 614. P-map 634, which is in the same HME as TTE 624, refers to TTE 626 in HME cluster 616. Thus, the p-mapping list to which page-t structure 602 refers comprises TTEs 620-626. Each of TTEs 620-626 corresponds to a separate virtual page that is mapped to the physical page to which page-t structure 602 corresponds. Thus, by traversing the p-mapping list to which page-t structure 602 corresponds, a relocation thread can discover all of the virtual pages that are mapped to the physical page to which page-t structure 602 corresponds.

In one embodiment of the invention, each page-t structure is associated with a separate mutex lock. In such an embodiment, no process or thread can traverse or modify a p-mapping list unless that process or thread has obtained the mutex lock that is associated with the page-t structure that refers to that p-mapping list.

According to one embodiment of the invention, whenever a mapping is established between a virtual page and a physical page, the virtual page's corresponding TTE is added to the p-mapping list to which the physical page's corresponding page-t structure refers. The virtual page's corresponding TTE may be added to the p-mapping list by locating the last TTE currently existing in the p-mapping list (i.e., the TTE whose corresponding p-map is currently "NULL"), and then updating the last TTE's corresponding p-map so that the last TTE's corresponding p-map refers to the virtual page's corresponding TTE.

In one embodiment of the invention, whenever an entire HME cluster is going to be removed from the linked list that contains that HME cluster, as described above, all of the p-mapping lists that contain any TTEs in that HME cluster are updated automatically so that those p-mapping lists no longer contain the TTEs in that HME cluster. For example, all of the p-maps that refer to those TTEs may be updated automatically to refer instead to other TTEs that are not contained in the HME cluster that is going to be removed.

HME Cluster Magazines

As is discussed above, a computing system may comprise multiple system boards, and each system board may comprise multiple physical pages and one or more CPUs. A CPU that is located on the same system board as a physical page is "local" relative to that physical page.

According to one embodiment of the invention, each CPU in the computing system is associated with one or more "HME cluster magazines." Each such HME cluster magazine is a pool of zero or more available HME clusters. An HME cluster magazine that is associated with a CPU that is local relative to a physical page is "local" relative to (a) that physical page and (b) any HME clusters that are contained in that physical page.

Each HME cluster magazine may contain up to a specified number of HME clusters. If a magazine contains the specified number of HME clusters, then that HME cluster magazine is full. In one embodiment of the invention, whenever an HME cluster is removed from the page tables, such as those depicted in FIG. 1, a determination is made as to whether any HME cluster magazine that is local relative to that HME cluster is not full. If at least one such HME cluster magazine is not full, then the HME cluster that was removed from the page tables is inserted into that HME cluster magazine.

Alternatively, if all of the HME cluster magazines that are local to the HME cluster are full, then the HME cluster is inserted into a "depot layer." The depot layer is also a pool of zero or more available HME clusters. However, unlike the HME cluster magazines, the depot layer is not specific to any system board.

According to one embodiment of the invention, whenever an HME cluster needs to be allocated to the virtual memory address space of a process, a determination is made as to whether there are any HME clusters in any of the HME cluster magazines that are associated with the CPU on which the process is executing. If there is at least one HME cluster in such an HME cluster magazine, then that HME cluster is removed from that HME cluster magazine and allocated to the process' virtual memory address space. The HME cluster is inserted into the page tables.

Alternatively, if all of the HME cluster magazines that are associated with the CPU on which the process is executing are empty, then an HME cluster is removed from the depot layer and allocated to the process' virtual memory address space. The HME cluster is inserted into the page tables. Typically, allocating an HME cluster from an HME cluster magazine is significantly faster than allocating an HME cluster from the depot layer.

Callback Registration

In one embodiment of the invention, for each process that performs DMA relative to a physical page, the p-mapping list to which that physical page's corresponding page-t structure refers contains a special TTE. The special TTE indicates (e.g., via a set bit) that it is a special TTE. The special TTE may also indicate the physical address of the physical page that contains the special TTE. Unlike other TTEs, the special TTE might not be contained within an HME cluster.

According to one embodiment of the invention, instead of containing the fields shown in FIG. 5, each special TTE contains a reference to a pre-handler mechanism and a reference to a post-handler mechanism. Such "callback" mechanisms may be implemented as object methods, for example. Each special TTE may also contain the values of any parameters that need to be passed to the callback mechanisms.

Before a particular process uses DMA relative to a physical page, that process provides, to a registration mechanism, references to the callback mechanisms that are customized for that particular process. The registration mechanism adds, to the p-mapping list to which the physical page's corresponding page-t structure refers, the special TTE that contains the references to the callback mechanisms.

In such an embodiment, whenever the contents of a "source" physical page are going to be relocated, the relocation thread traverses the source p-mapping list as described above. Whenever the relocation thread locates a special TTE in the source p-mapping list, the relocation thread invokes the pre-handler mechanism to which that special TTE refers. Each pre-handler mechanism, when invoked, causes its corresponding process to desist from attempting to access the "source" physical page (which may be identified as a parameter of the invocation of the pre-handler mechanism) using DMA until instructed otherwise.

After the contents of the "source" physical page have been moved to the "target" physical page, as described above, the relocation thread again traverses the source p-mapping list. This time, whenever the relocation thread locates a special TTE in the source p-mapping list, the relocation thread invokes the post-handler mechanism to which that special TTE refers. Each post-handler mechanism, when invoked, may instruct its corresponding process that the previously halted DMAs may resume. The post-handler mechanism for a particular process may invoke a mechanism that causes a physical memory address to be "re-fetched" so that relevant mappings are updated to refer to the "target" physical page instead of the "source" physical page.

Pre-Handler Lock Management

A process's pre-handler mechanism may be implemented in such a way that the pre-handler mechanism relocates the contents of a particular physical page itself. After the contents of a physical page have been relocated, the memory that the physical page occupied may be freed for other purposes. That memory may be added to a "page free list" that processes may consult when seeking for memory to allocate.

Under such circumstances, there is nothing for the relocation thread to do after calling the pre-handler mechanism; the contents of the physical page already have been relocated by the time the pre-handler mechanism finishes.

Usually, prior to calling a process' pre-handler mechanism, the relocation thread acquires a mutex lock that corresponds to the physical page whose contents are going to be relocated. If the pre-handler mechanism then attempts to acquire the mutex lock before moving the contents of the physical page, then the pre-handler mechanism may end up "blocking" indefinitely, because the relocation thread that invoked the pre-handler mechanism already has acquired the mutex lock for that physical page.

To prevent this indefinite blocking from occurring, in one embodiment of the invention, the relocation thread "downgrades" a physical page's mutex lock to a "shared" lock prior to invoking a process' pre-handler mechanism. This allows the pre-handler mechanism to relocate the physical page's contents even though the relocation thread already holds a lock relative to the physical page. When the pre-handler mechanism is finished moving the content of the physical page, the pre-handler mechanism frees the physical page's memory.

According to one embodiment of the invention, after the pre-handler mechanism has finished, the relocation thread checks whether the physical page's memory has been freed. The relocation thread may do so by examining the status of a "p-free" bit that corresponds to the physical page. The "p-free" bit is located in a metadata structure (e.g., a "kmem-cache" structure) that is maintained outside of the physical page whose contents are relocated—when the pre-handler mechanism frees the physical page's memory, the pre-handler mechanism sets the "p-free" bit that corresponds to the physical page. If the relocation thread determines that the "p-free" bit is set, then the relocation thread does not attempt to move the contents of the now-freed physical page or to invoke any process' post-handler mechanism. In this case, the relocation thread releases the lock on the physical page. Alternatively, if the relocation thread determines that the "p-free" bit is not set, then the relocation thread "upgrades" the physical page's shared lock back to a mutex lock and proceeds to relocate the contents of the physical page in the manner described above.

In one embodiment of the invention, to prevent other processes from accessing the physical page prematurely, prior to releasing the lock on the physical page, the relocation thread sets a "p-tran" bit that corresponds to the physical page. Like the "p-free" bit, the "p-tran" bit is located in a metadata structure (e.g., a "kmem-cache" structure) that is maintained outside of the physical page whose contents are relocated. While the "p-tran" bit for a particular physical page is set, it signals to processes that the particular physical page is in a transitory state and should not be used to allocate memory.

In one embodiment of the invention, whenever any process or thread would allocate memory within a particular physical page, the status of the "p-tran" bit that corresponds to the particular physical page is examined first. If the "p-tran" bit is set, then that process or thread is provided another physical page in which to allocate memory—the particular physical page remains in the "page free list." In one embodiment of the invention, when the relocation thread determines that the "p-free" bit for a physical page is set, as described above, the relocation thread acquires the mutex lock for the physical page and clears the "p-tran" bit so that the "p-tran" bit is no longer set.

Retiring Physical Pages

When the contents of a physical page are being relocated, the contents may be relocated HME cluster-by-HME cluster. Unless something is done to prevent it, a process may attempt to allocate an HME cluster in the "source" physical page before all of the HME clusters in that page have been relocated.

Thus, in one embodiment of the invention, prior to relocating the contents of a physical page, the relocation thread invokes a "retirement" mechanism. The relocation thread may pass, as a parameter to the retirement mechanism, a virtual address range that corresponds to the physical page. The retirement mechanism updates kernel metadata so that the memory allocation subsystem does not allow any further memory allocations in the physical page to which that virtual address range is mapped. Thus, the physical page is "retired." As a result, when a process attempts to allocate an HME cluster, the memory allocation subsystem allocates the HME cluster in a physical page other than a "retired" physical page.

Additionally, in one embodiment of the invention, when an HME cluster in a "retired" physical page is freed, that HME cluster is placed in the depot layer instead of an HME cluster magazine. If this were not so, then the reference count for the HME cluster might never drop to zero, and the HME cluster might be stuck forever in an HME cluster magazine, and the memory of the physical page that contains the HME cluster might never be freed.

In one embodiment of the invention, whenever an available HME cluster is being sought in the depot layer, before that HME cluster is allocated and placed in the page tables, a determination is made as to whether the physical page in which that HME cluster is located is "retired." If that physical page is "retired," then another HME cluster in a different physical page is found instead.

Kmem_Cache_Reloc( )

Figure 7A:
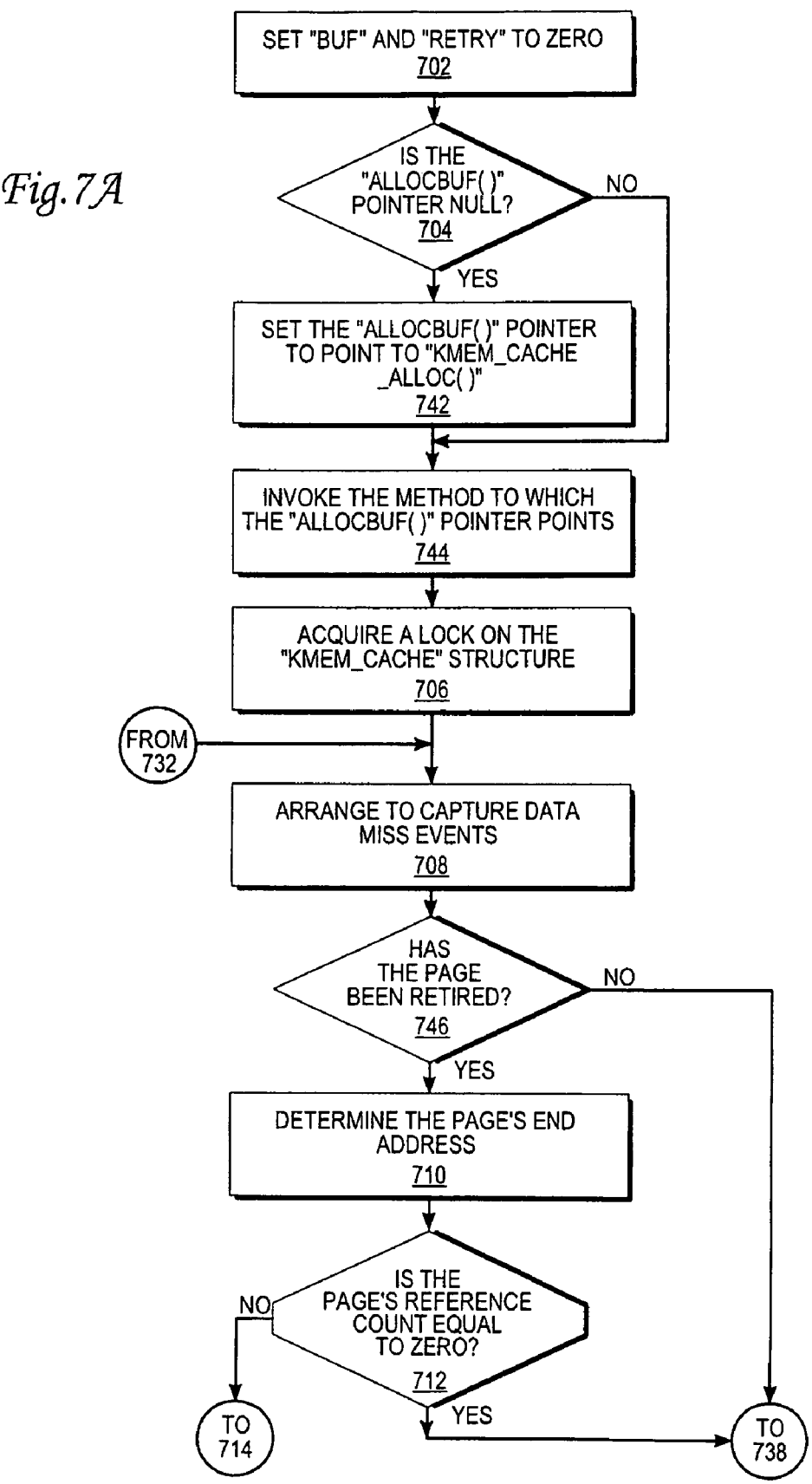
FIGS. 7A-C collectively show a flow diagram that illustrates an example of the behavior of a "kmem_cache_reloc( )" method that relocates the contents of a physical page, according to an embodiment of the present invention.
Figure 7B:
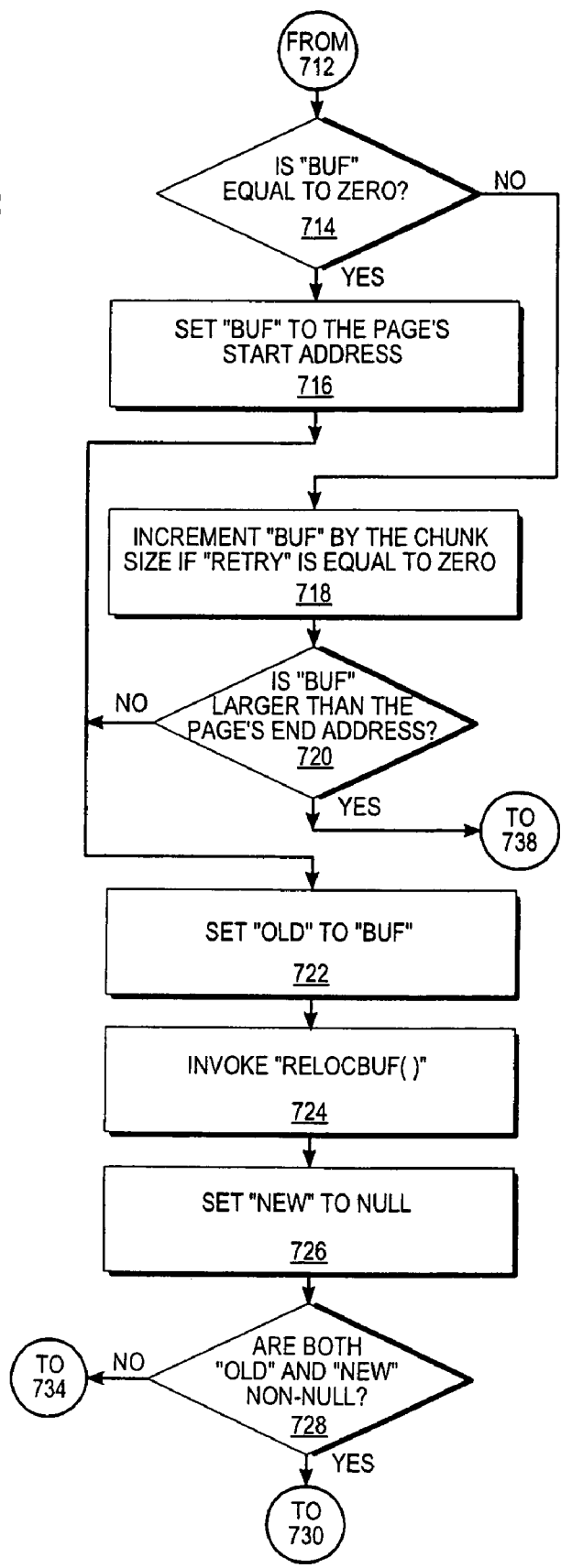
Figure 7C:
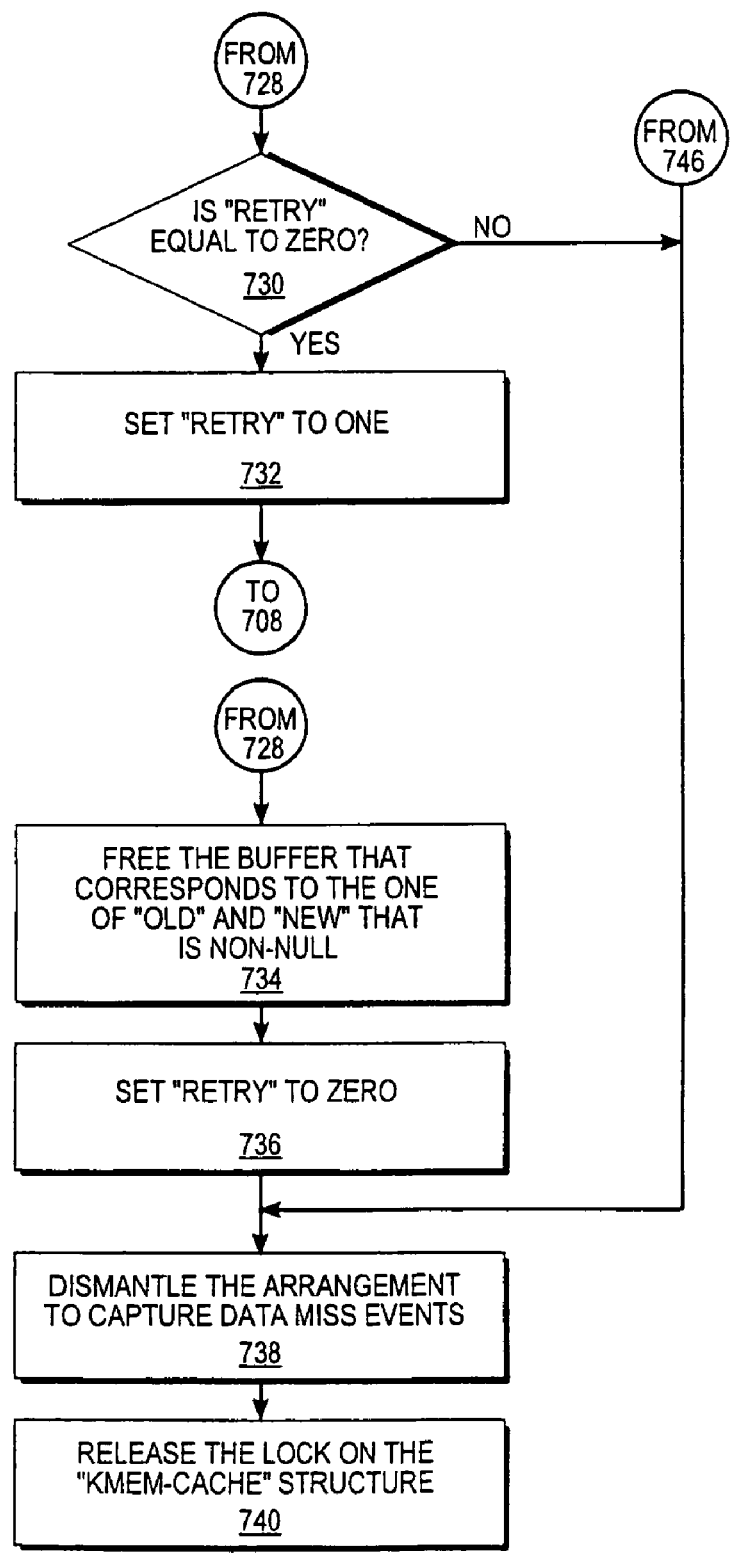

FIGS. 7A-C collectively show a flow diagram that illustrates an example of the behavior of a "kmem_cache_reloc( )" method that relocates the contents of a physical page, according to an embodiment of the present invention. In one embodiment of the invention, for each buffer in a "source" physical page, kmem_cache_reloc( ) moves the contents of that buffer to a corresponding buffer in a "target" physical page, buffer-by-buffer. As is described below, kmem_cache_reloc( ) may intercept certain events in case the buffers in the physical page vanish for any reason during the relocation.

In one embodiment of the invention, kmem_cache_reloc( ) accepts, as parameters, a pointer to a "kmem-cache" structure, the starting address of a physical page, a pointer to an "allocbuf( )" method, and a pointer to a "relocbuf( )" method. Where implemented, "allocbuf( )" is method that allocates memory for a particular kind of buffer, such as an HME cluster, and "relocbuf( )" is a method that relocates a particular kind of buffer, such as an HME cluster. Each different type of buffer may have separate corresponding "allocbuf( )" and "relocbuf( )" methods. Some types of buffers might not have any such corresponding methods implemented.

When invoked, in block 702, kmem_cache_reloc( ) initially sets two local variables, "buf" and "retry," to zero. Next, in block 704, kmem_cache_reloc( ) determines whether the pointer to the "allocbuf( )" method is null. If the pointer is null, then control passes to block 742. Otherwise, control passes to block 744.

In block 742, kmem_cache_reloc( ) sets the "allocbuf( )" pointer to the method "kmem_cache_alloc( )," which is a generic method that allocates memory for a generic buffer. Control passes to block 744.

In block 744, kmem_cache_reloc( ) invokes the method to which the "allocbuf( )" pointer points. That method allocates a new buffer. For example, the new buffer may be an HME cluster. Kmem_cache_reloc( ) sets the value of a variable "new" to point to the new buffer. Control passes to block 706.

Next, in block 706, kmem_cache_reloc( ) acquires a lock on the "kmem-cache" structure that was passed as a parameter to kmem_cache_reloc( ). Next, in block 708, kmem_cache_reloc( ) arranges to capture any "data miss" events (e.g., page faults) that pertain to the physical page that is identified by the starting address that was passed as a parameter to kmem_cache_reloc( ). This capture arrangement may be made using an "on_trap" mechanism such as is provided by the Sun Solaris OS. As a result, when such data miss events occur, the events may be passed to kmem_cache_reloc( ) instead of the existing miss handlers (e.g., the page fault handler), and kmem_cache_reloc( ) may handle the misses in a customized manner.

Inside of the "kmem-cache" structure that was passed as a parameter to kmem_cache_reloc( ) is a field called "cache_slabretire" that corresponds to the physical page. In one embodiment of the invention, this field is set to "one" when the corresponding physical page is "retired." In block 746, kmem_cache_reloc( ) examines this field. If this field is set to "zero," then the physical page has not been retired, and something has gone wrong. In such a case, control passes to block 738.

Otherwise, in block 710, kmem_cache_reloc( ) finds, in the "kmem-cache" structure, a pointer to a "kmem_slab" structure that corresponds to the physical page. The "kmem_slab" structure contains a field called "slab_base," which indicates the base address of the physical page. By adding the value of a field called "cache_slabsize" (in the "kmem-cache" structure) to the value of the "slab_base" field, kmem_cache_reloc( ) determines the end address in the physical page.

The physical page is associated with a reference count. In block 712, kmem_cache_reloc( ) examines the physical page's reference count. If the reference count is zero, then the physical page's memory has already been freed. In such a case, control passes to block 738.

Otherwise, in block 714, kmem_cache_reloc( ) determines whether the value of "buf" is zero. If the value of "buf" is zero, then, in block 716, kmem_cache_reloc( ) sets the value of "buf" to the value of "slab_base," and control passes to block 722.

Alternatively, if the value of "buf" is not zero, then, in block 718, if the value of "retry" is zero, then kmem_cache reloc( ) increments "buf" by the value of a "cache_chunksize" field that is stored in the "kmem-cache" structure. The value of "cache_chunksize" indicates the size of the buffers in the physical page. Control passes to block 720.

In block 720, kmem_cache_reloc( ) determines whether the value of "buf" is larger than the end address of the physical page, as determined in block 710. If the value of "buf" is larger than the end address, then control passes to block 738.

Otherwise, in block 722, kmem_cache_reloc( ) sets the value of "old" to the value of "buf." Control passes to block 724.

In block 724, kmem_cache_reloc( ) invokes the "relocbuf( )" method. The "kmem-cache" structure, a pointer to variable "old," and a pointer to variable "new" are passed as parameters to the "relocbuf( )" method. The "relocbuf( )" method moves data from a source buffer (e.g., HME cluster) that is located at the address corresponding to the value of "old" to a destination buffer (e.g., HME cluster) that is located at the address corresponding to the value of "new."

In block 726, kmem_cache_reloc( ) sets the value of "new" to null.

In block 728, kmem_cache_reloc( ) determines whether both the values of "old" and "new" are non-null. If both the values of "old" and "new" are non-null, then control passes to block 730. Otherwise, control passes to block 734.

In block 730, kmem_cache_reloc( ) determines if the value of "retry" is zero. If the value of "retry" is zero, then control passes to block 732. Otherwise, control passes to block 738.

In block 732, kmem_cache_reloc( ) sets the value of "retry" to one. Control passes back to block 708.

Alternatively, in block 734, kmem_cache_reloc( ) frees the buffer that corresponds to the one of "old" and "new" that is non-null. Control passes to block 736.

In block 736, kmem_cache_reloc( ) sets the value of "retry" to zero.

In block 738, the arrangement to capture any "data miss" events, which was performed in block 708, is dismantled, so that the default miss handler mechanisms resume handling the appropriate "data miss" events.

In block 740, kmem_cache_reloc( ) releases the lock on the "kmem-cache" structure (kmem_cache_reloc( ) acquired this lock in block 706). In one embodiment of the invention, the buffer that is located at the address indicated by variable "new" is freed. Kmem_cache_reloc( ) returns gracefully.

Relocbuf( )

Figure 8A:
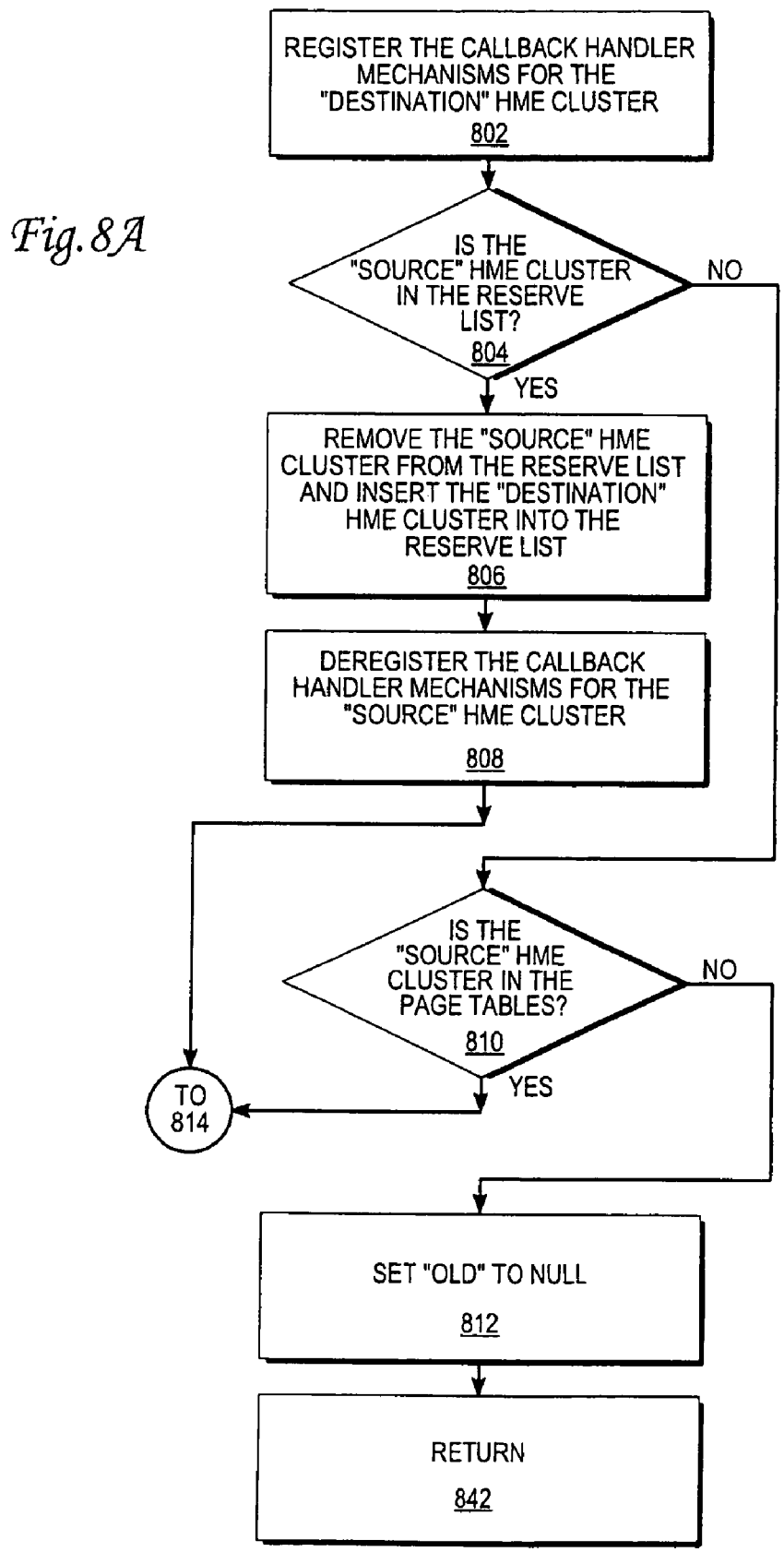
FIGS. 8A-C collectively show a flow diagram that illustrates an example of the behavior of a "relocbuf( )" method that is implemented specifically to relocate an HME cluster, according to an embodiment of the present invention.
Figure 8B:
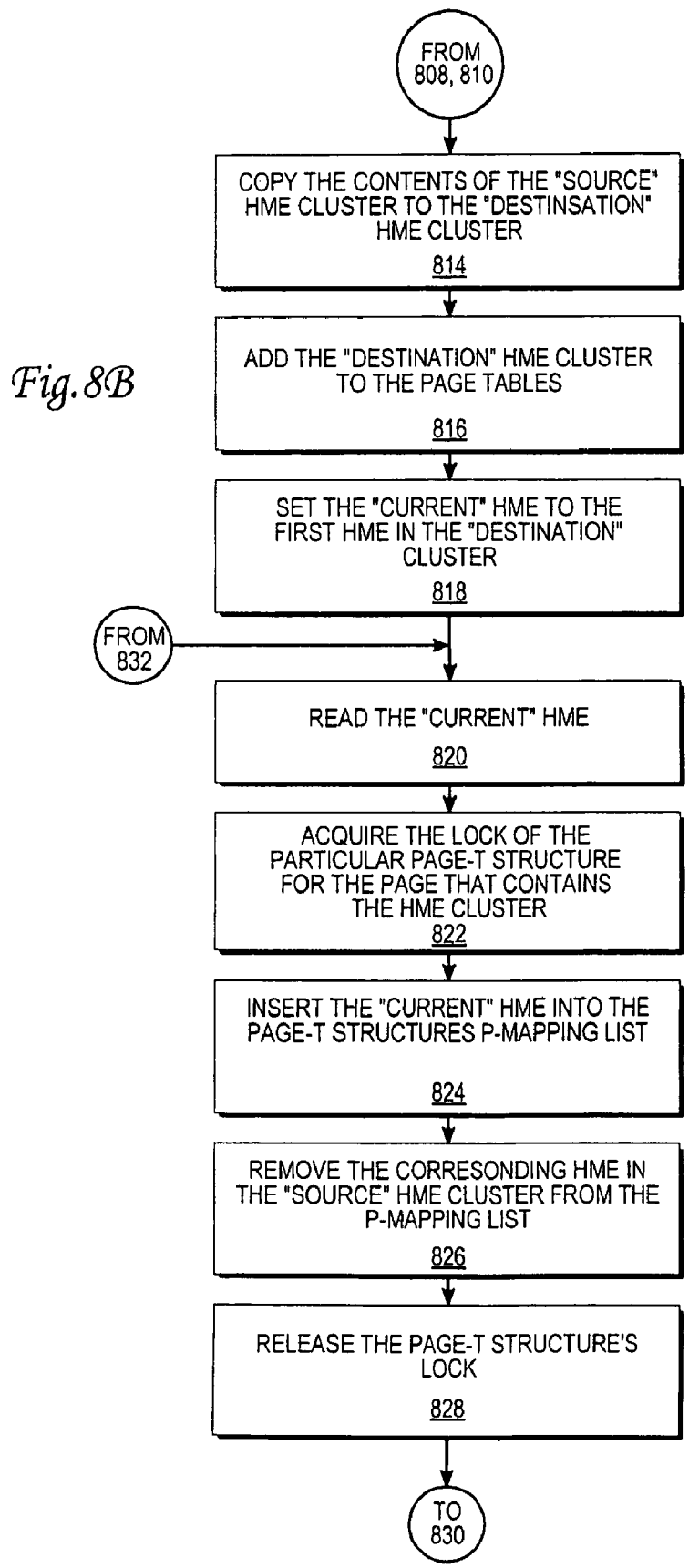
Figure 8C:
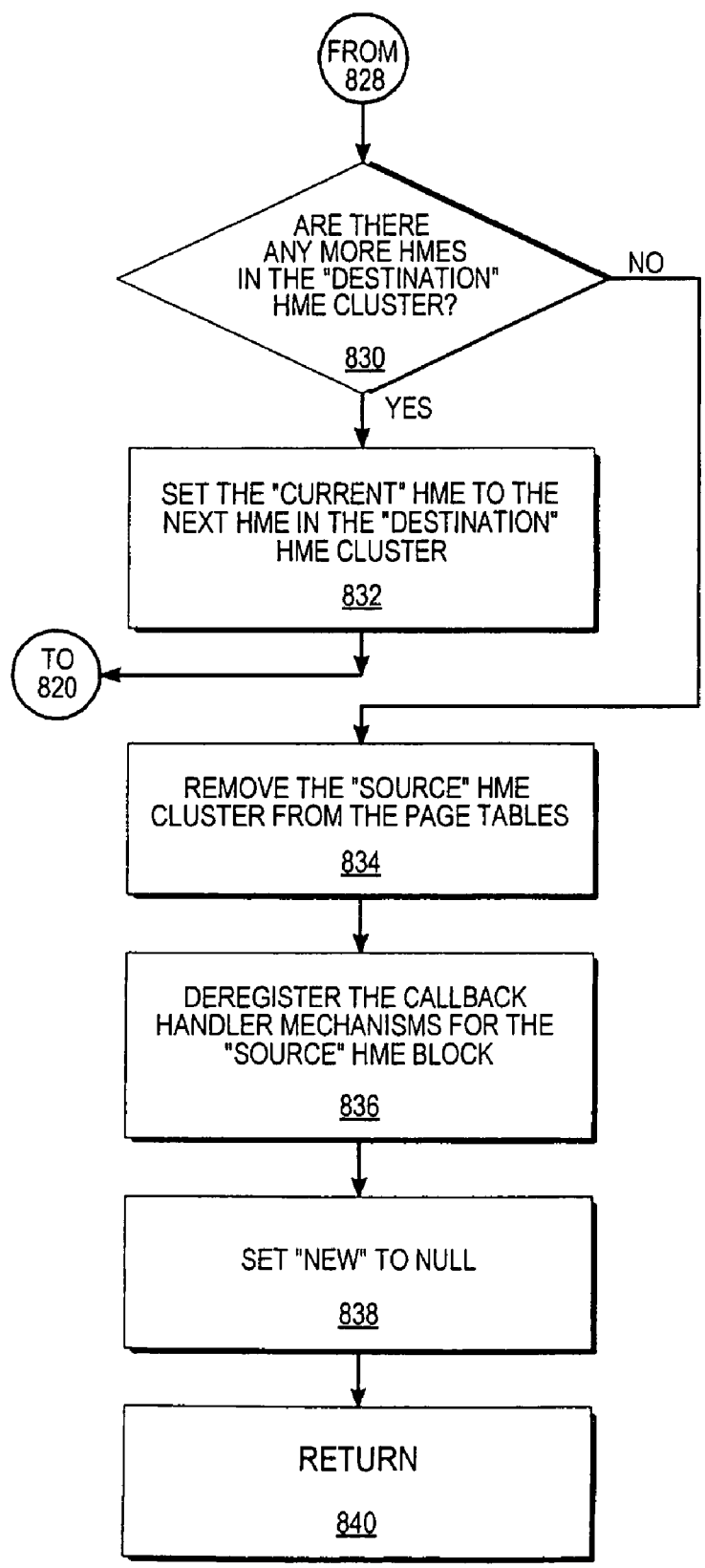

As is described above, in one embodiment of the invention, kmem_cache_reloc( ) invokes a method called "relocbuf( )" in block 724. FIGS. 8A-C collectively show a flow diagram that illustrates an example of the behavior of a "relocbuf( )" method that is implemented specifically to relocate the contents of an HME cluster, according to an embodiment of the present invention.

The "source" HME cluster whose contents are going to be relocated may a part of any one of several logical entities. The "source" HME cluster may be in a linked list to which one of HME hash bucket headers 102A-N refers. The "source" HME cluster may be in a statically allocated array of HME clusters (the "reserve list"). The "source" HME cluster may be in an HME cluster magazine. The "source" HME cluster may be in the depot layer.

As is discussed above, the value of "old," which is passed as a parameter to relocbuf( ), indicates the physical address of the "source" HME cluster, regardless of which logical entity the "source" HME cluster is a part. The value of "new," which is also passed as a parameter to relocbuf( ), indicates the physical address of the "destination" HME cluster.

In block 802, relocbuf( ) registers the callback handler mechanisms for the "destination" HME cluster.

In block 804, relocbuf( ) determines whether the "source" HME cluster is in the "reserve list." If the "source" HME cluster is in the "reserve list," then the "source" HME cluster is not currently being used to store data. If the "source" HME cluster is in the "reserve list," then control passes to block 806. Otherwise, control passes to block 810.

In block 806, relocbuf( ) removes the "source" HME cluster from the "reserve list," and inserts the "destination" HME cluster into the "reserve list" in the place of the "source" HME cluster.

In block 808, relocbuf( ) deregisters the callback handler mechanisms for the "source" HME cluster. Control passes to block 814.

Alternatively, in block 810, relocbuf( ) determines whether the "source" HME cluster is in the page tables (i.e., the linked lists of HME clusters 104 to which HME hash bucker headers 102A-N refer). If the "source" HME cluster is in the page tables, then the "source" HME cluster is currently being used to store data.

To attempt to locate the "source" HME cluster in the page tables, relocbuf( ) may read the tag of the HME buffer that is located at the physical address to which the variable "old" points, and then examine the tags of each HME cluster in the linked list to which the appropriate HME hash bucket header refers. If relocbuf( ) finds an HME cluster that has the matching tag, then relocbuf( ) has located the "source" HME cluster in the page tables.

However, if relocbuf( ) does not find an HME cluster with the right tag, then the "source" HME cluster might be in a linked list to which another HME hash bucket header refers; the "source" HME cluster's tag might have been changed after relocbuf( ) read the tag. This may occur if, after relocbuf( ) read the tag, some other process obtained the lock on the HME cluster, freed the HME cluster, reallocated the HME cluster (thus changing the tag), and then released the lock.

In one embodiment of the invention, relocbuf( ) can determine whether the "source" HME cluster's tag was changed by comparing the tag for which relocbuf( ) is searching with the tag that is stored in the HME buffer that is located at the physical address to which the variable "old" points. If the tags are different, then relocbuf( ) concludes that the "source" HME cluster's tag was changed. In this case, relocbuf( ) attempts to use the changed tag to locate the HME cluster in the page tables.

If the "source" HME cluster is in the page tables, then control passes to block 814. Otherwise, control passes to block 812.

Another possibility, if relocbuf( ) cannot find the find an HME cluster with the right tag in the page tables, is that the "source" HME cluster might have been freed by another process after relocbuff( ) read the tag of the HME buffer that is located at the physical address to which the variable "old" points. If the tag has not changed, then this is the only possibility, for otherwise, relocbuf( ) would have found the "source" HME cluster in the first linked list of HMEs that relocbuf( ) searched. In this case, the "source" HME cluster is either in an HME cluster magazine or the depot layer.

If the HME cluster is either in an HME cluster magazine or the depot layer, then relocbuf( ) does not need to relocate the contents of the "source" HME cluster; in this case, the "source" HME cluster has been freed. Thus, in block 812, relocbuf( ) sets "old" to null, and in block 842, relocbuf( ) simply returns control to the process or thread that invoked relocbuf( ); typically, relocbuf( ) will return control to kmem_cache_reloc( ). Setting "old" to null causes kmem_cache_reloc( ) to free the buffer that corresponds to "new," as discussed above with reference to block 734 of FIG. 7.

Alternatively, in block 814, the "source" HME cluster has been located in either the "reserve list" or the page tables. Under such circumstances, the contents of the "source" HME cluster actually need to be relocated. Therefore, in block 814, relocbuf( ) copies (e.g., using a "block copy" memory operation) the contents of the "source" HME cluster to the "destination" HME cluster, to which the parameters "old" and "new" respectively point.

In block 816, relocbuf( ) adds the "destination" HME cluster to the page tables by hashing the "destination" HME cluster's tag and inserting the "destination" HME cluster into the linked list to which the corresponding HME hash bucket header refers. Because the tag of the "destination" HME cluster is the same as the tag of the "source" HME cluster after the copying operation, the "destination" HME cluster is placed in the same linked list in which the "source" HME cluster is located.

In block 818, relocbuf( ) sets the "current" HME to the first HME in the "destination" HME cluster. For example, relocbuf( ) might set the "current" HME to HME 204A in FIG. 2.

In block 820, relocbuf( ) reads the "current" HME.

As is discussed above in connection with FIG. 6, in one embodiment of the invention, each page-t structure is associated with a separate mutex lock. In block 822, relocbuf( ) acquires the mutex lock that is associated with the particular page-t structure that corresponds to the physical page in which the HME cluster is located.

In block 824, relocbuf( ) inserts the "current" HME into the p-mapping list to which the particular page-t structure refers. P-mapping lists are discussed above with reference to FIG. 6.

In block 826, relocbuf( ) removes the corresponding HME in the "source" HME cluster from the p-mapping list to which the particular page-t structure refers. For example, if the "current" HME is the first HME in the "destination" HME cluster, then relocbuf( ) removes the first HME in the "source" HME cluster from the p-mapping list.

In block 828, relocbuf( ) releases the mutex lock that is associated with the particular page-t structure.

In block 830, relocbuf( ) determines whether there are any more HMEs after the "current" HME in the "destination" HME cluster. If there are one or more HMEs in the "destination" HME cluster, then control passes to block 832. Otherwise, control passes to block 834.

In block 832, relocbuf( ) sets the "current" HME to the HME that follows the "current" HME in the "destination" HME cluster. For example, if the "current" HME is HME 204A, as shown in FIG. 2, then relocbuf( ) may set the "current" HME to be HME 204B. Control passes back to block 820.

Alternatively, in block 834, after all of the "source" HMEs have been removed from p-mapping lists and all of the "destination" HMEs have been inserted into p-mapping lists, relocbuf( ) removes the "source" HME cluster from the page tables. For example, relocbuf( ) may remove the "source" HME cluster from the linked list in which the "source" HME cluster is located, as shown in FIG. 1.

In block 836, relocbuf( ) deregisters the callback handler mechanisms for the "source" HME block.

In block 838, relocbuf( ) sets the value of "new" to null, and, in block 840, relocbuf( ) returns control to the process or thread that invoked relocbuf( ); typically, relocbuf( ) will return control to kmem_cache_reloc( ). Setting "new" to null causes kmem_cache_reloc( ) to free the buffer that corresponds to "old," as discussed above with reference to block 734 of FIG. 7.

Using Static PAHMEs to Avoid Infinite Recursion

In one embodiment of the invention, the special TTEs are contained within special "physical access" HMEs, or "PAHMES," which are not contained within HME clusters like other HMEs are. Thus, when a callback mechanism is initially registered, as discussed above, a corresponding PAHME needs to be initialized. If there is no existing physical page that contains PAHMEs, then a physical page that contains PAHMEs needs to be initialized. Before the initialization can be completed, a virtual address within kernel virtual memory address space needs to be mapped to the physical address of this physical page.

Like any other virtual-to-physical page mapping, this mapping needs to be stored in a TTE before the mapping can be considered complete. As is discussed above with reference to FIG. 4, each TTE is contained within an HME. If there is no existing physical HME cluster (as would be the case when the computing system first boots up), then an HME cluster needs to be initialized. However, before the initialization of this HME cluster can be completed, a kernel process needs to register a callback mechanism for the HME cluster, because the kernel process will be using DMA to access the HME cluster. Before the callback mechanism can be registered, though, a corresponding PAHME needs to be initialized. As is apparent from the discussion above, an infinite recursive loop could be entered. The computing system's stack would grow with each iteration of such an infinite loop, until finally, the computing system would run out of memory resources, halt, and require rebooting.

A computing system may need several PAHMEs in which to store callback mechanisms for HME clusters that will be initialized while the computing system is booting up. For example, the computing system may need at least three PAHMEs specifically for this purpose. Therefore, according to one embodiment of the invention, multiple PAHMEs are statically (rather than dynamically) allocated when the computing system boots up. In one embodiment of the invention, a static array of three PAHMEs is allocated when the computing system boots up. Unlike the memory that is occupied when data structures are dynamically allocated, the memory that this static array occupies is never freed for other purposes.

In one embodiment of the invention, the statically allocated PAHMEs are used to temporarily store callback mechanisms for HME clusters that need to be initialized while the computing system boots up. As is discussed above, before the first physical page of PAHMEs can be dynamically allocated and initialized, an HME cluster needs to be dynamically allocated and initialized to store the mapping between a virtual page and the first physical page of PAHMEs, but before the HME cluster can be dynamically allocated and initialized, a callback mechanism for the HME cluster needs to be stored in a PAHME. Therefore, in one embodiment of the invention, one of the statically allocated PAHMEs is temporarily used to store the callback mechanism for the HME cluster.

In one embodiment of the invention, the callback mechanism for the HME cluster has been stored in a statically allocated PAHME when the HME cluster is dynamically allocated. Then, one or more physical pages of PAHMEs are dynamically allocated. Mappings between virtual pages and the dynamically allocated physical pages of PAHMEs are stored in the HME cluster. Once this has been done, the callback mechanisms that were temporarily stored in the statically allocated PAHME are moved to a PAHME in one of the dynamically allocated physical pages so that the statically allocated PAHME can be used to store other data if needed during the bootup process.

Thus, in one embodiment of the invention, the statically allocated PAHMEs may be used to temporarily store data that would be otherwise be stored in a dynamically allocated PAHME before any PAHMEs can be dynamically allocated. Use of the statically allocated PAHMEs especially for critical purposes avoids entry into the infinite recursive loop discussed above.

In one embodiment of the invention, after the first physical page of PAHMEs has been dynamically allocated, a subset of the PAHMEs in that page (for example, twenty such PAHMEs) are reserved to be used only under circumstances where the statically allocated PAHMEs otherwise would be used. This helps to prevent overuse of the statically allocated PAHMEs, which typically will be few in number. Thus, in such an embodiment, the statically allocated PAHMEs are not used after the first physical page of PAHMEs has been dynamically allocated unless all of the PAHMEs in the subset are currently being used to store data.

In one embodiment of the invention, one or more HMEs also may be statically allocated during bootup and used to store HME data temporarily until that data can be transferred to dynamically allocated HMEs.

Hardware Overview

Figure 9:
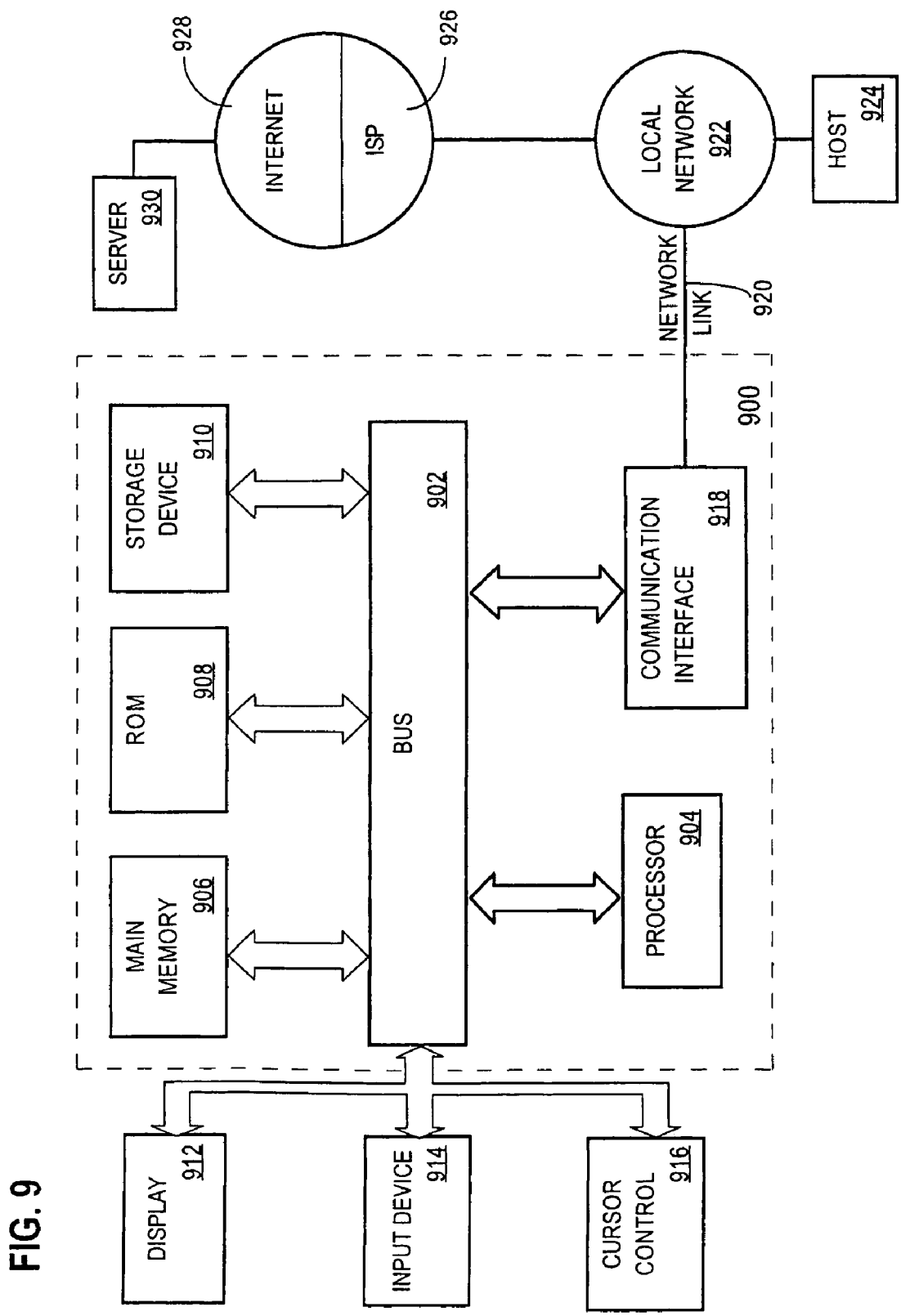
FIG. 9 is a hardware block diagram of an example computer entity, upon which certain embodiments of the invention may be implemented.
Figure 8B:
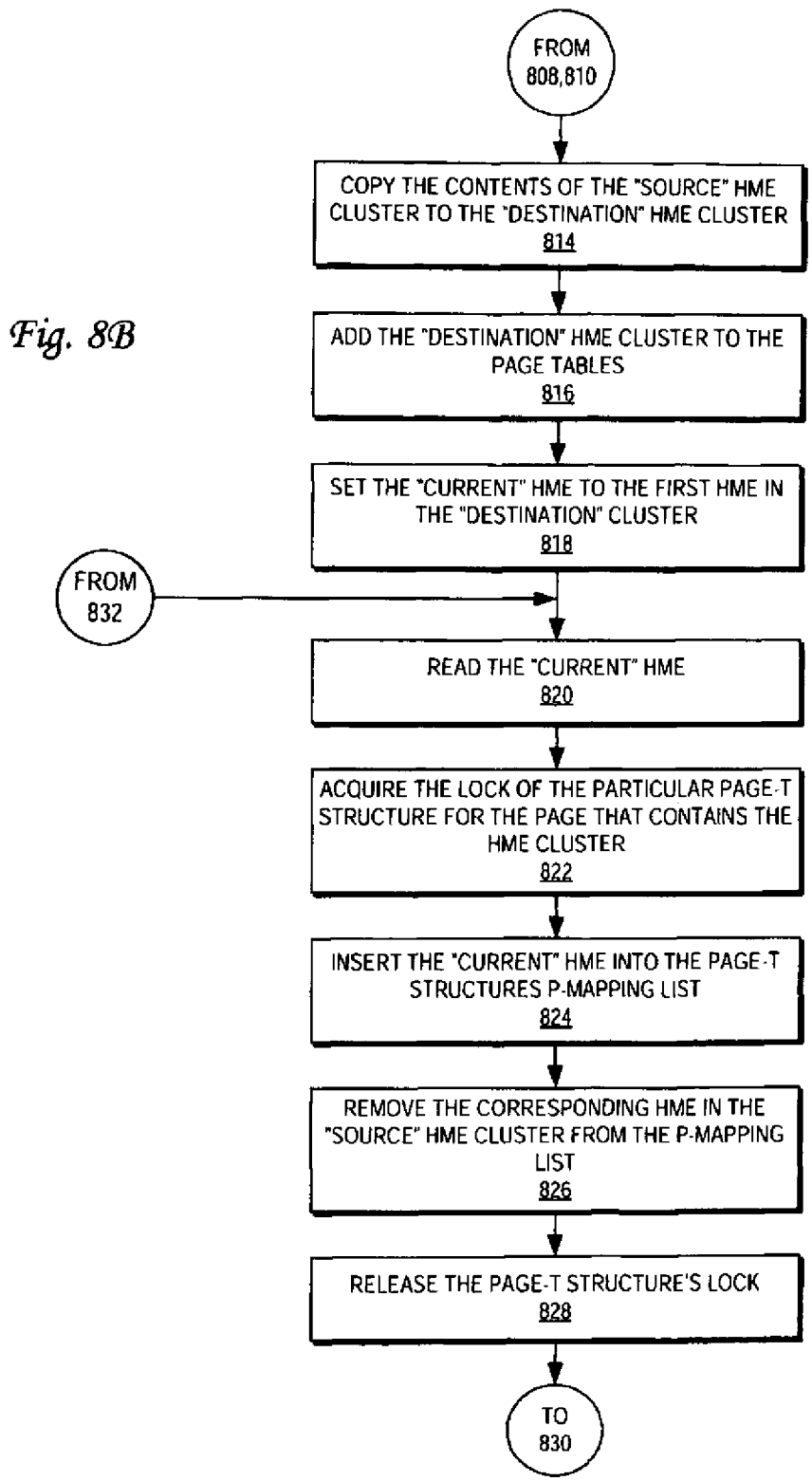

FIG. 9 is a block diagram that illustrates a computer system 900 upon which an embodiment of the invention may be implemented. Computer system 900 includes a bus 902 for facilitating information exchange, and one or more processors 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions by processor 904. Computer system 900 may further include a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

In computer system 900, bus 902 may be any mechanism and/or medium that enables information, signals, data, etc., to be exchanged between the various components. For example, bus 902 may be a set of conductors that carries electrical signals. Bus 902 may also be a wireless medium (e.g. air) that carries wireless signals between one or more of the components. Bus 902 may also be a medium (e.g. air) that enables signals to be capacitively exchanged between one or more of the components. Bus 902 may further be a network connection that connects one or more of the components. Overall, any mechanism and/or medium that enables information, signals, data, etc., to be exchanged between the various components may be used as bus 902.

Bus 902 may also be a combination of these mechanisms/media. For example, processor 904 may communicate with storage device 910 wirelessly. In such a case, the bus 902, from the standpoint of processor 904 and storage device 910, would be a wireless medium, such as air. Further, processor 904 may communicate with ROM 908 capacitively. In this instance, the bus 902 would be the medium (such as air) that enables this capacitive communication to take place. Further, processor 904 may communicate with main memory 906 via a network connection. In this case, the bus 902 would be the network connection. Further, processor 904 may communicate with display 912 via a set of conductors. In this instance, the bus 902 would be the set of conductors. Thus, depending upon how the various components communicate with each other, bus 902 may take on different forms. Bus 902, as shown in FIG. 9, functionally represents all of the mechanisms and/or media that enable information, signals, data, etc., to be exchanged between the various components.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications. According to one embodiment of the invention, the transmission media referred to above are tangible (i.e., "substantially real") media.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 990 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

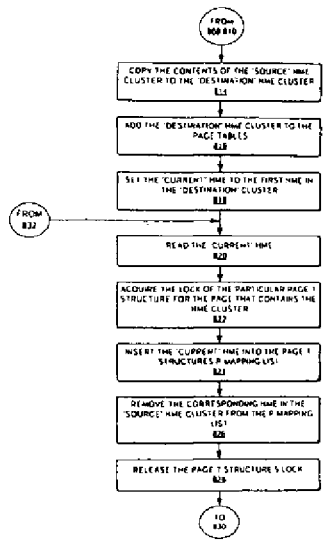

What is claimed is:

1. A machine-implemented method for facilitating the relocation of data from a source page in memory to a destination page in memory, the method comprising:
   determining whether the source page potentially is being accessed by an Input/Output (I/O) device; and
   in response to a determination that the source page potentially is being accessed by an I/O device, temporarily preventing the I/O device from accessing the source page;
   relocating contents of the source page to the destination page; and
   after the contents of the source page have been relocated to the destination page, allowing the I/O device to access contents of the destination page;
   wherein the step of determining whether the source page potentially is being accessed by the I/O device comprises the kernel traversing a list of linked data structures in response to a determination that the contents of the source page are to be relocated;
   wherein the step of the kernel traversing the list of linked data structures comprises the kernel traversing the list of linked data structures until the kernel locates a particular data structure that the kernel previously inserted into the linked list of data structures in response to the kernel receiving a first call that an Input/Output Memory Management Unit (IOMMU) made to the kernel;
   wherein the first call specified a physical address of the source page;
   wherein the IOMMU made the first call to the kernel in response to the IOMMU receiving a second call from the I/O device;
   wherein the second call specified a particular virtual address that the I/O device would be using to access the source page using Direct Virtual Memory Access (DVMA).

2. The method of claim 1, wherein temporarily preventing the I/O device from accessing the source page comprises temporarily suspending all transactions on a bus to which the I/O device is connected.

3. The method of claim 2, wherein temporarily suspending all transactions of the bus comprises clearing a bit that controls whether Peripheral Component Interconnection (PCI) bus arbitration logic on a host bridge controller chip currently enables I/O devices to perform Direct Virtual Memory Access (DVMA) transactions on the bus.

4. The method of claim 1, wherein determining whether the source page potentially is being accessed by an I/O device comprises determining whether a list, to which a data structure that corresponds to the source page refers, contains a particular type of entry.

5. The method of claim 4, wherein the list to which the data structure that corresponds to the source page refers comprises a linked list of two or more translation table entries (TTEs), one or more of which TTEs indicates a mapping between a virtual page and the source page.

6. The method of claim 1, further comprising:
   after temporarily preventing the I/O device from accessing the source page, but prior to relocation of the contents of the source page to the destination page, ensuring that all incomplete memory transactions involving the I/O device have finished.

7. The method of claim 6, wherein ensuring that all incomplete memory transactions involving the I/O device have finished comprises flushing one or more First In First Out buffers (FIFOs).

8. The method of claim 1, further comprising:
   after temporarily preventing the I/O device from accessing the source page, but prior to allowing the I/O device to access contents of the destination page, updating a data structure;
   wherein before the updating of the data structure, the data structure indicates a mapping between a particular virtual address and a physical address of the source page; and
   wherein after the updating of the data structure, the data structure indicates a mapping between the particular virtual address and a physical address of the destination page instead of the physical address of the source page.

9. The method of claim 1, further comprising:
   after relocation of the contents of the source page to the destination page, but prior to allowing the I/O device to access contents of the destination page, invalidating an entry in an Input/Output Memory Management Unit (IOMMU) Translation Lookaside Buffer (TLB) that contains a mapping between a virtual address and a physical address of the source page.

10. A machine-implemented method for facilitating the relocation of data from a source page in memory to a destination page in memory, the method comprising:

before a first time that an Input/Output (I/O) device driver is going to access a source page using Direct Virtual Memory Access (DVMA), the I/O device driver using a computing system's device driver interface (DDI) to make a first call to an Input/Output Memory Management Unit's (IOMMU's) device driver, wherein, in the call, the I/O device driver specifies a virtual address that the I/O device driver will be using to access the source page;

in response to the first call, the IOMMU's device driver creating, in an IOMMU Translation Lookaside Buffer (TLB), a mapping between the virtual address and a physical address of the source page;

the IOMMU's device driver making a second call to the operating system kernel, wherein, in the second call, the IOMMU's device driver specifies the physical address of the source page;

in response to the second call, the kernel locating a particular "page-t" structure that corresponds to the source page;

the kernel inserting, into a linked list of translation table entries (TTEs) to which the particular "page-t" structure refers, an "I/O page" TTE, wherein "I/O page" TTE indicates that an IOMMU may be accessing the source page on behalf of an I/O device;

in response to the kernel determining that contents of the source page are to be relocated, before moving the contents of the source page, the kernel traversing the linked list of TTEs to which the particular "page-t" structure refers;

in response to the kernel locating the "I/O page" TTE in the linked list of TTEs to which the particular "page-t" structure refers, the kernel quiescing one or more Central Processing Units (CPUs) and making a third call to the IOMMU's device driver, wherein, in the third call, the kernel indicates that the IOMMU needs to stop accessing the source page;

in response to the third call, the IOMMU's device driver temporarily suspending a system I/O bus, wherein, while the system I/O bus is suspended, I/O devices cannot begin new DVMA transactions;

in response to the third call, the IOMMU's device driver flushing one or more First In First Out buffers (FIFOs) that may store information relating to pending DVMA transactions, wherein flushing the one or more FIFOs causes the pending DVMA transactions to finish;

while the system I/O bus is suspended, the kernel moving the contents of the source page to the destination page;

after the kernel has finished moving the contents of the source page, the kernel traversing a linked list of TTEs to which a "page-t" structure of the destination page refers;

in response to the kernel locating the "I/O page" TTE in the linked list of TTEs to which a "page-t" structure of the destination page refers, the kernel making a fourth call to the IOMMU's device driver, wherein, in the fourth call, the kernel notifies the IOMMU that the IOMMU needs to update the mappings in the IOMMU TLB to reflect the physical address of the destination page;

in response to the fourth call, the IOMMU's device driver updating an in-memory table, wherein, as a result of the updating of the in-memory table, a virtual address that was formerly mapped to a physical address of the source page is mapped to a physical address of the destination page instead;

in response to the fourth call, the IOMMU's device driver invalidating, in the IOMMU TLB, a particular mapping between a virtual address and the physical address of the source page, wherein invalidation of the particular mapping causes the IOMMU to load, into the IOMMU TLB, an updated mapping from the in-memory table;

the IOMMU unsuspending the system I/O bus;

and the kernel unsuspending the one or more CPUs.

11. A volatile or non-volatile machine-readable storage medium storing one or more sequences of instructions, which instructions, when executed by one or more processors, cause the one or more processors to carry out the steps of:

determining whether a source page potentially is being accessed by an Input/Output (I/O) device; and in response to a determination that the source page potentially is being accessed by an I/O device, temporarily preventing the I/O device from accessing the source page;

relocating contents of the source page to the destination page; and after the contents of the source page have been relocated to a destination page, allowing the I/O device to access contents of the destination page;

wherein the step of determining whether the source page potentially is being accessed by the I/O device comprises the kernel traversing a list of linked data structures in response to a determination that the contents of the source page are to be relocated;

wherein the step of the kernel traversing the list of linked data structures comprises the kernel traversing the list of linked data structures until the kernel locates a particular data structure that the kernel previously inserted into the linked list of data structures in response to the kernel receiving a first call that an Input/Output Memory Management Unit (IOMMU) made to the kernel;

wherein the first call specified a physical address of the source page;

wherein the IOMMU made the first call to the kernel in response to the IOMMU receiving a second call from the I/O device;

wherein the second call specified a particular virtual address that the I/O device would be using to access the source page using Direct Virtual Memory Access (DVMA).

12. The non-volatile or volatile machine-readable storage medium of claim 11, wherein temporarily preventing the I/O device from accessing the source page comprises temporarily suspending all transactions on a bus to which the I/O device is connected.

13. The non-volatile or volatile machine-readable storage medium of claim 12, wherein temporarily suspending all transactions of the bus comprises clearing a bit that controls whether Peripheral Component Interconnection (PCI) bus arbitration logic on a host bridge controller chip currently enables I/O devices to perform Direct Virtual Memory Access (DVMA) transactions on the bus.

14. The non-volatile or volatile machine-readable storage medium of claim 11, wherein determining whether the source page potentially is being accessed by an I/O device comprises determining whether a list, to which a data structure that corresponds to the source page refers, contains a particular type of entry.

15. The non-volatile or volatile machine-readable storage medium of claim 14, wherein the list to which the data structure that corresponds to the source page refers comprises a linked list of two or more translation table entries (TTEs), one or more of which TTEs indicates a mapping between a virtual page and the source page.

16. The non-volatile or volatile machine-readable storage medium of claim 11, wherein the instructions, when executed by the one or more processors, cause the one or more processors to carry out the steps of:
after temporarily preventing the I/O device from accessing the source page, but prior to relocation of the contents of the source page to the destination page, ensuring that all incomplete memory transactions involving the I/O device have finished.

17. The non-volatile or volatile machine-readable storage medium of claim 16, wherein ensuring that all incomplete memory transactions involving the I/O device have finished comprises flushing one or more First In First Out buffers (FIFOs).

18. The non-volatile or volatile machine-readable storage medium of claim 11, wherein the instructions, when executed by the one or more processors, cause the one or more processors to carry out the steps of:
after temporarily preventing the I/O device from accessing the source page, but prior to allowing the I/O device to access contents of the destination page, updating a data structure;
wherein before the updating of the data structure, the data structure indicates a mapping between a particular virtual address and a physical address of the source page; and
wherein after the updating of the data structure, the data structure indicates a mapping between the particular virtual address and a physical address of the destination page instead of the physical address of the source page.

19. The non-volatile or volatile machine-readable storage medium of claim 11, wherein the instructions, when executed by the one or more processors, cause the one or more processors to carry out the steps of:
after relocation of the contents of the source page to the destination page, but prior to allowing the I/O device to access contents of the destination page, invalidating an entry in an Input/Output Memory Management Unit (IOMMU) Translation Lookaside Buffer (TLB) that contains a mapping between a virtual address and a physical address of the source page.

* * * * *

UNITED STATES PATENT AND TRADEMARK OFFICE
CERTIFICATE OF CORRECTION

| | | |
|---|---|---|
| PATENT NO. | : 7,721,068 B2 | Page 1 of 3 |
| APPLICATION NO. | : 11/451785 | |
| DATED | : May 18, 2010 | |
| INVENTOR(S) | : Eric E. Lowe et al. | |

It is certified that error appears in the above-identified patent and that said Letters Patent is hereby corrected as shown below:

The Title page, showing an illustrative figure, should be deleted and substitute therefor the attached Title page.

On sheet 8 of 10, in Figure 8B, Box 814, line 2, delete ""DESTINSATION"" and insert -- "DESTINATION" --, therefor. See attached On sheet 8 of 10, in Figure 8B, Box 826, line 1, delete "CORRESONDING" and insert -- CORRESPONDING --, therefor. See attached Signed and Sealed this
Tenth Day of April, 2012

David J. Kappos
*Director of the United States Patent and Trademark Office*

(12) United States Patent
Lowe et al.

(10) Patent No.: US 7,721,068 B2
(45) Date of Patent: May 18, 2010

(54) RELOCATION OF ACTIVE DMA PAGES

(75) Inventors: Eric E. Lowe, Pflugerville, TX (US); Wesley Shao, Union City, CA (US)

(73) Assignee: Oracle America, Inc., Redwood Shores, CA (US)

( * ) Notice: Subject to any disclaimer, the term of this patent is extended or adjusted under 35 U.S.C. 154(b) by 865 days.

(21) Appl. No.: 11/451,785

(22) Filed: Jun. 12, 2006

(65) Prior Publication Data

US 2008/0005495 A1   Jan. 3, 2008

(51) Int. Cl.
*G06F 9/26*  (2006.01)
*G06F 13/00* (2006.01)

(52) U.S. Cl. ............... 711/206; 711/165; 711/150; 711/170; 711/200; 711/202; 711/203; 711/207; 711/208; 711/209; 711/210; 710/36

(58) Field of Classification Search .......... 711/152, 711/150, 165, 170, 200, 202, 203, 206, 207, 711/208, 209, 210; 710/36
See application file for complete search history.

(56) References Cited

U.S. PATENT DOCUMENTS

| | | | |
|---|---|---|---|
| 4,787,031 A | 11/1988 | Karger et al. | 718/100 |
| 4,961,134 A | 10/1990 | Crus et al. | 707/8 |
| 5,440,746 A | 8/1995 | Lentz | 345/504 |
| 5,574,944 A * | 11/1996 | Stager | 710/5 |
| 5,577,231 A | 11/1996 | Scalzi et al. | 703/26 |
| 5,659,798 A | 8/1997 | Blumrich et al. | 710/26 |
| 5,765,198 A * | 6/1998 | McCrocklin et al. | 711/165 |
| 5,802,341 A | 9/1998 | Kline et al. | 711/209 |
| 5,918,244 A * | 6/1999 | Percival | 711/119 |
| 6,052,699 A | 4/2000 | Huelsbergen et al. | 707/206 |
| 6,067,608 A * | 5/2000 | Perry | 711/203 |
| 6,085,296 A | 7/2000 | Karkhanis et al. | 711/147 |
| 6,112,286 A * | 8/2000 | Schimmel et al. | 711/208 |
| 6,125,430 A | 9/2000 | Noel et al. | 711/152 |
| 6,349,355 B1 | 2/2002 | Draves et al. | 711/6 |

(Continued)

OTHER PUBLICATIONS

'CS372 class notes 11-13' from www.cs.utexas.edu/users/lorenzo/corsi/cs372/03F/notes/11-13.pdf, Nov. 21, 2003, by Corsi.*

(Continued)

*Primary Examiner*—Henry W. H. Tsai
*Assistant Examiner*—Steven G Snyder
(74) *Attorney, Agent, or Firm*—Osha • Liang LLP

(57) ABSTRACT

According to one embodiment of the invention, a technique is provided for facilitating the relocation of data from a source page to a destination page in a computing system in which I/O devices may conduct DVMA transactions via an IOMMU. Before the relocation, it is determined whether any devices potentially are accessing the source page. If it is determined that a device potentially is accessing the source page, then the IOMMU's device driver ("bus nexus") "suspends" the bus. The bus nexus allows any pending memory transactions to finish. While the bus is suspended, the kernel moves the contents of the source page to the destination page. After the kernel has moved the contents, the IOMMU's TLB is updated so that the virtual address that was mapped to the source page's physical address is mapped to the destination page's physical address. The bus nexus "unsuspends" the bus.

19 Claims, 10 Drawing Sheets